(12) United States Patent
Maley et al.

(10) Patent No.: US 11,463,266 B2
(45) Date of Patent: *Oct. 4, 2022

(54) SYSTEM AND METHOD FOR SECURE AUTHENTICATION AND AUTHORIZATION

(71) Applicant: VOUCH.IO L.L.C., Alpharetta, GA (US)

(72) Inventors: Thomas Anthony Maley, Alpharetta, GA (US); Kristof Sajdak, Alpharetta, GA (US)

(73) Assignee: VOUCH.IO L.L.C., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/714,015

(22) Filed: Apr. 5, 2022

(65) Prior Publication Data

US 2022/0231861 A1 Jul. 21, 2022

Related U.S. Application Data

(63) Continuation-in-part of application No. 16/914,320, filed on Jun. 27, 2020, now Pat. No. 11,329,820.

(51) Int. Cl.
| | |
|---|---|
| *H04L 9/40* | (2022.01) |
| *H04L 9/32* | (2006.01) |
| *H04L 9/30* | (2006.01) |
| *H04L 9/00* | (2022.01) |
| *H04L 9/38* | (2006.01) |

(52) U.S. Cl.
CPC ............ *H04L 9/3247* (2013.01); *H04L 9/30* (2013.01); *H04L 9/3218* (2013.01); *H04L 9/3239* (2013.01); *H04L 9/38* (2013.01); *H04L 9/50* (2022.05)

(58) Field of Classification Search
CPC ....... H04L 9/3247; H04L 9/30; H04L 9/3218; H04L 9/3239; H04L 9/50; H04L 9/38
See application file for complete search history.

(56) References Cited

U.S. PATENT DOCUMENTS

| | | | |
|---|---|---|---|
| 10,447,786 B1 * | 10/2019 | Arnberg | H04L 67/125 |
| 10,734,703 B2 * | 8/2020 | Bartlett | H01Q 9/0407 |
| 11,050,763 B1 * | 6/2021 | Lyle | H04L 63/126 |
| 2018/0218466 A1 * | 8/2018 | Mowatt | G06Q 30/0635 |
| 2018/0302222 A1 * | 10/2018 | Agrawal | G06F 21/604 |
| 2018/0330349 A1 * | 11/2018 | Uhr | H04L 9/0643 |
| 2019/0253434 A1 * | 8/2019 | Biyani | H04L 63/126 |
| 2019/0305967 A1 * | 10/2019 | Hamel | H04L 9/3271 |

(Continued)

*Primary Examiner* — Ghodrat Jamshidi
(74) *Attorney, Agent, or Firm* — Rahman LLC

(57) ABSTRACT

A system and method for secure authentication and authorization between a user device and an Internet of Things (IoT) device that is associated with an asset. The method includes onboarding, using one or more processors that are operatively associated with a distributed ledger, the user device at least based on a public key identity of the user device; onboarding a user with the user device; onboarding an identity of the IoT device and the asset such that association between the asset and the IoT device is endorsed on the distributed ledger; and facilitating the user device to retrieve a first set of data packets representative of any of a relevant electronic authoritative document(s), associated consensus proof(s), and block header(s) from the distributed ledger.

20 Claims, 19 Drawing Sheets

(56) References Cited

U.S. PATENT DOCUMENTS

| | | |
|---|---|---|
| 2019/0319939 A1 | 10/2019 | Hamel et al. |
| 2020/0051074 A1* | 2/2020 | Suh ........................ G06Q 20/36 |
| 2020/0118124 A1 | 4/2020 | Menon |
| 2020/0160334 A1* | 5/2020 | Alba ..................... H04L 9/0637 |
| 2020/0280491 A1* | 9/2020 | Riedl ...................... H04L 67/34 |
| 2020/0380141 A1* | 12/2020 | Wang .................. G06F 21/6218 |
| 2021/0004225 A1* | 1/2021 | Karunakaran ............ G06F 8/60 |
| 2021/0176039 A1 | 6/2021 | Fang et al. |

* cited by examiner

US 11,463,266 B2

SYSTEM AND METHOD FOR SECURE AUTHENTICATION AND AUTHORIZATION

CROSS-REFERENCE TO RELATED APPLICATION(S)

This application is a continuation-in-part to U.S. Ser. No. 16/914,320, filed on Jun. 27, 2020 and entitled "SYSTEM AND METHOD FOR SECURE AUTHENTICATION AND AUTHORIZATION", the complete disclosure of which, in its entirety, is herein incorporated by reference.

BACKGROUND

Technical Field

The embodiments herein generally relate to a system and method for secure authentication and authorization, and more particularly, to a system and method for securing authentication and authorization between a user device and an Internet of Things (IoT) device, associated with an asset.

Description of the Related Art

The recent decade has witnessed the use of sophisticated and improved technologies such as the advent of Internet of Things (IoT), which has enabled connectivity of devices with other devices and applications connected to internet. Such IoT devices involve a plurality of computing devices, mechanical devices or electronic devices, which are inter-related, which can execute data transfer over a network without requiring any human intervention. Such IoT devices are usually small devices incorporated in sensing systems, electronic circuits, and the like, for various purposes related to regulating action of several objects or providing or command for accessing assets such as vehicles, house, and the like. However, such small devices can have limited storing and processing capacity.

Further, in order to transfer the data collected by IoT devices, the IoT devices need to be connected online or through a network to a computing device or a platform. However, this aspect may not only compromise the security of the data being exchanged, but may also pose a risk to an asset associated with the IoT, by compromise of authenticity of the computing device or platform.

SUMMARY

In view of the foregoing, an embodiment herein provides a method for secure authentication and authorization between a user device and an Internet of Things (IoT) device that is associated with an asset, the method comprising onboarding, using one or more processors that are operatively associated with a distributed ledger, an identity of the user device at least based on a public key identity of the user device; onboarding an identity of a user of the user device based on an electronic user identity authoritative document that is stored on the distributed ledger, wherein an onboarded user device is mapped with an onboarded user identity; onboarding an identity of the IoT device and an identity of the asset in a manner such that association between the asset and the IoT device is endorsed on the distributed ledger based on an electronic signature generated by the user device using a user device respective private key, an endorsement further establishing a relationship between the user and the asset, wherein the onboarding of the identity of the IoT device comprises storing a public key identity of the IoT device, and updating a Proof of Authority (PoA) trust anchor block height for the IoT device; and facilitating the user device to retrieve a first set of data packets representative of any of a relevant electronic authoritative document(s), associated consensus proof(s), and block header(s) from the distributed ledger, the first set of data packets being used by the user device for: asserting and verifying relationships between a private key identity of the user device and the relevant electronic authoritative document(s) associated with any of a user device identity, a user identity, a persona status granted to the user over the asset, an asset identity, and the identity of the IoT device; verifying the associated consensus proof(s) for each retrieved authoritative document against the respective block header(s); and verifying the block header(s) against a PoA distributed ledger trust anchor so as to update the block header(s).

The IoT device may comprise a low-powered and resource constrained IoT device. The user device may comprise any of a smartphone, a mobile electronic device, and a smart computing device. The asset may be selected from any of a vehicle, home, factory, office, building, residential property, or any part thereof. The IoT device may comprise any of a microcontroller and an electronic control unit (ECU). The distributed ledger may be a blockchain. The user identity authoritative document may be associated with a user identity attribute selected from any of a phone number, an email address, a driver license number, a social security number, and a unique user identity number. Any of the user and the asset may be represented through multiple devices. When the IoT device is working in an offline environment, the method may further comprise connecting the user device with the IoT device over an available communication interface so as to authenticate the user device by transmitting a second set of data packets to the IoT device, the second set of data packets being selected from the first set of data packets, wherein the second set of data packets being used for: verifying, at the IoT device, an authenticity and integrity of the received second set of data packets, a verification comprising verifying relationships between the relevant authoritative document(s) and a private key identity of the IoT device; verifying, at the IoT device, using the second set of data packets, consensus proofs for each authoritative document against the respective block header(s); and verifying, at the IoT device, the block header(s) against the block header of PoA distributed ledger trust anchor so as to update the block header(s).

The user device may be configured to connect with the IoT device over the communication interface for receiving public key identity of the IoT device and the PoA trust anchor block height for the IoT device, prior to transmission of the second set of data packets by the user device, wherein using the communication interface is selected from any of a Bluetooth® low energy (BLE) device, near field communication (NFC) device, radio frequency (RF) device, ultra wideband (UWB) device, and Controller Area Network bus (CAN bus) device. The user device may transmit a first authentication message with a first digital signature to the IoT device in a manner such that the IoT device uses a first public key of the user device to verify the first digital signature, and authorizes the first authentication message by verifying the persona status that an authenticated user is granted over the asset. The IoT device may transmit a second authentication message with a second digital signature to the user device in a manner such that the user device uses a second public key of the IoT device to verify the second digital signature and to confirm that the second authentication message originated from the IoT device that is linked to the asset that the user device initiated contact with.

The user device may use a user device private key to generate a third digital signature for an ephemeral key representation, and sends both the third digital signature and the ephemeral key representation to the IoT device in a manner such that the IoT device authenticates the ephemeral key representation from the user device based on the third digital signature and the first public key. The IoT device may use an IoT device private key to generate a fourth digital signature for the ephemeral key representation and sends both the fourth digital signature and the ephemeral key representation to the user device such that the user device authenticates the ephemeral key representation from the IoT device based on the fourth digital signature and the second public key so as to allow both the user device and the IoT device to possess each other's ephemeral public key and have authenticated an origin of an ephemeral public key based on which a standardized key exchange protocol is enabled.

The user, using the user device, may endorse a second user, wherein the second user is a previously onboarded user, with a guest persona over the asset, wherein the second user shares a unique identity attribute with the user, and wherein at least one attribute of the second user is associated in the distributed ledger so as to identify and authenticate the second user based on a digital signature of the second user. The user may endorse the second user in relation to the asset based on one or more constraints, the constraints being selected from any of a time of access, location of access, and one or more allowed action. Ownership of the user over the asset may be transferred to a third user based on an endorsement, by the user, of a persona of the user to an identity of the third user and the asset, and wherein at least one attribute of the third user is associated in the distributed ledger so as to identify and authenticate the third user based on a digital signature of the third user. The IoT device and the user device may trust each other by comparing an incoming block header(s) against trust anchor of the IoT device and the user device, wherein digital signatures on an incoming block header are verified by a quorum of PoA validator nodes public keys that are already trusted on the user device and the IoT device.

Another embodiment provides a non-transitory computer readable storage medium storing one or more sequences of instructions, which when executed by one or more processors, causes secure authentication and authorization between a user device and an Internet of Things (IoT) device associated with an asset, by performing a method comprising onboarding, using one or more processors that are operatively associated with a distributed ledger, an identity of the user device at least based on a public key identity of the user device; onboarding an identity of a user of the user device based on an electronic user identity authoritative document that is stored on the distributed ledger, wherein an onboarded user device is mapped with an onboarded user identity; onboarding an identity of the IoT device and an identity of the asset in a manner such that association between the asset and the IoT device is endorsed on the distributed ledger based on an electronic signature generated by the user device using a user device respective private key, an endorsement further establishing a relationship between the user and the asset, wherein the onboarding of the identity of the IoT device comprises storing a public key identity of the IoT device, and updating a Proof of Authority (PoA) trust anchor block height for the IoT device; and facilitating the user device to retrieve a first set of data packets representative of any of a relevant electronic authoritative document(s), associated consensus proof(s), and block header(s) from the distributed ledger, the first set of data packets being used by the user device for: asserting and verifying relationships between a private key identity of the user device and the relevant electronic authoritative document(s) associated with any of a user device identity, a user identity, a persona status granted to the user over the asset, an asset identity, and the identity of the IoT device; verifying the associated consensus proof(s) for each retrieved authoritative document against the respective block header(s); and verifying the block header(s) against a PoA distributed ledger trust anchor so as to update the block header(s).

Another embodiment provides a system for secure authentication and authorization between a user device and an Internet of Things (IoT) device that is associated with an asset, the system comprising one or more computing devices; and a blockchain system configured to host a blockchain, the blockchain being accessible by each of the one or more computing devices, wherein the one or more computing devices comprises one or more processors coupled with a memory, the memory storing instructions which when executed by the one or more processors cause the system to: onboard, using one or more processors that are operatively associated with a blockchain, an identity of the user device at least based on a public key identity of the user device; onboard an identity of a user of the user device based on an electronic user identity authoritative document that is stored on the blockchain, wherein an onboarded user device is mapped with an onboarded user; onboard an identity of the IoT device and an identity of the asset in a manner such that association between the asset and the IoT device is endorsed on the blockchain based on an electronic signature generated by the user device using a user device respective private key, an endorsement further establishing a relationship between the user and the asset, wherein onboarding of the identity of the IoT device comprises storing a public key identity of the IoT device, and updating a Proof of Authority (PoA) trust anchor block height for the IoT device; and facilitate the user device to retrieve a first set of data packets representative of any of a relevant electronic authoritative document(s), associated consensus proof(s), and block header(s) from the blockchain, the first set of data packets being used by the user device to: assert and verify relationships between a private key identity of the user device and the relevant electronic authoritative document(s) associated with any of user device identity, a user identity, a persona status granted to the user over the asset, the asset, and the identity of the IoT device; verify the associated consensus proof(s) for each retrieved authoritative document against respective block header(s); and verify the block header(s) against a PoA blockchain trust anchor so as to update the block header(s).

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
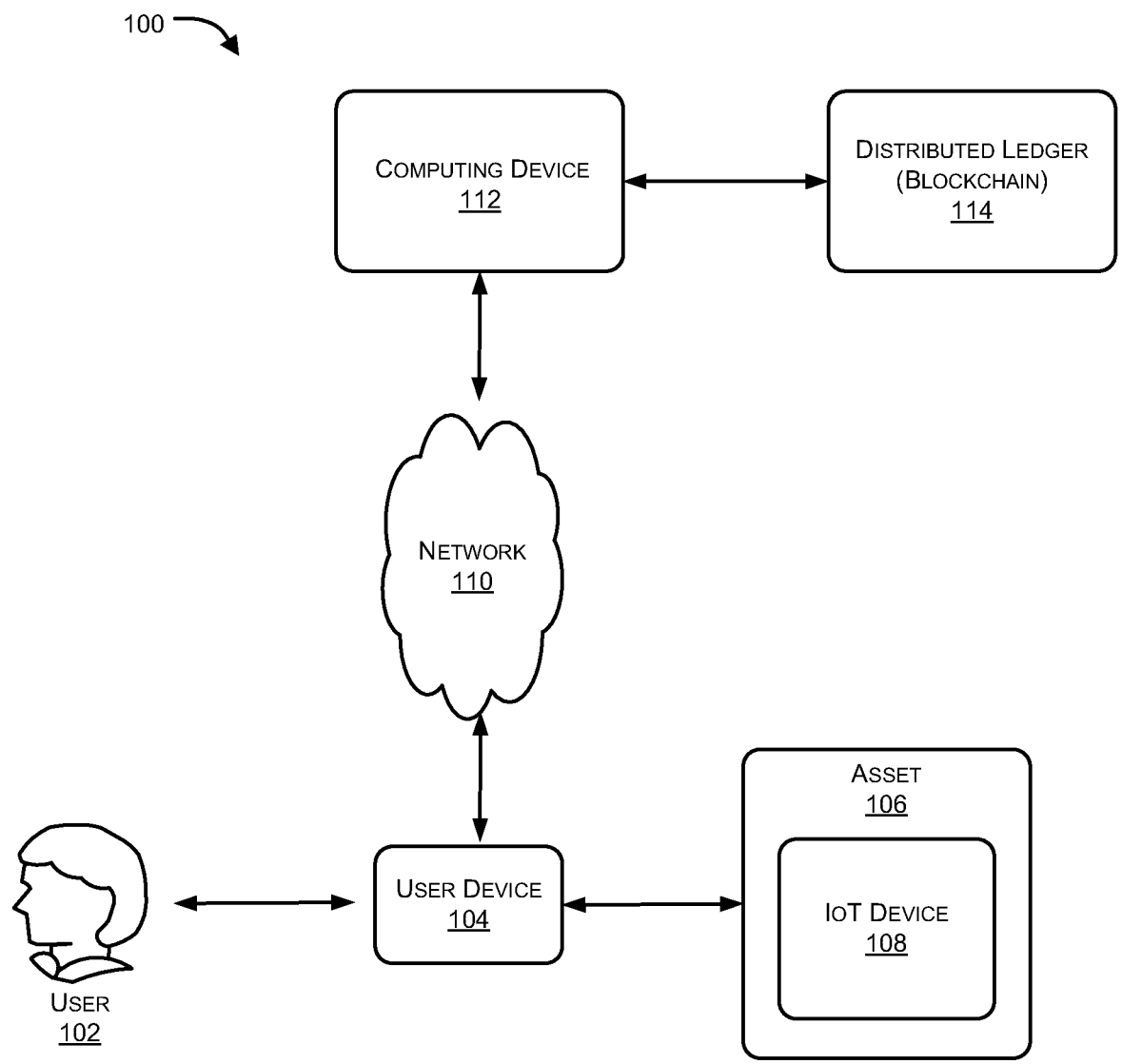
FIG. 1 illustrates an exemplary architecture including a computing device for secure authentication and authorization between a user device and an Internet of Things (IoT) device, which may be implemented according to an embodiment herein.

Embodiments herein include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators, and may be performed in real-time.

Various methods described herein may be practiced by combining one or more machine-readable storage media containing the code according to the embodiments herein with appropriate standard computer hardware to execute the code contained therein. An apparatus for practicing various embodiments herein may involve one or more computers (or one or more processors within a single computer) and storage systems containing or having network access to computer program(s) coded in accordance with various methods described herein, and the method the embodiments herein could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that embodiments herein will be thorough and complete and will fully convey the scope of the embodiments herein to those of ordinary skill in the art. The embodiments herein disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the embodiments herein. Moreover, all statements herein reciting embodiments of the embodiments herein, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the embodiments herein are to be accorded the widest scope encompassing numerous alternatives, modifications, and equivalents consistent with the principles and features disclosed. For the purpose of clarity, details relating to technical material that is known in the technical fields related to the embodiments herein have not been described in detail so as not to unnecessarily obscure the embodiments herein.

Thus, for example, it will be appreciated by those of ordinary skill in the art that the diagrams, schematics, illustrations, and the like represent conceptual views or processes illustrating systems and methods embodying the embodiments herein. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the embodiments herein. Those of ordinary skill in the art further understand that the exemplary hardware, software, processes, methods, and/or operating systems described herein are for illustrative purposes and, thus, are not intended to be limited to any particular named element.

The embodiments herein may be provided as a computer program product, which may include a machine-readable storage medium tangibly embodying thereon instructions, which may be used to program the computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data may be stored and that does not include carrier waves and/or transitory electronic signals propagating wirelessly or over wired connections. Examples of a non-transitory medium may include but are not limited to, a magnetic disk or tape, optical storage media such as compact disk (CD) or digital versatile disk (DVD), flash memory, memory or memory devices. A computer program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, the embodiments herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

All methods described herein may be performed in any suitable order unless otherwise indicated herein or otherwise clearly contradicted by context. The use of any and all examples, or exemplary language (e.g., "such as") provided with respect to certain embodiments herein is intended merely to better illuminate the embodiments herein and does not pose a limitation on the scope of the embodiments herein otherwise claimed. No language in the specification should be construed as indicating any non-claimed element essential to the practice of the embodiments herein.

Various terms as used herein are shown below. To the extent a term used in a claim is not defined below, it should be given the broadest definition persons in the pertinent art have given that term as reflected in printed publications and issued patents at the time of filing.

The term "onboarding" refers to a step of integrating, introducing or familiarizing a system, computing device, with at least one selected from an entity or a user, an identity of an entity or a user, a device or its identity, an object, asset or a property or their respective identities.

The term "Proof-of-Authority (PoA) based distributed ledger" refers to an algorithm or a consensus method related to a distributed ledger such as blockchain, and is designed to impart a set of entities, an authority to validate transactions or interactions with the network, and to update the registry of the distributed ledger accordingly.

The term "consensus proof(s)" refers to the proof of validation obtained in a conventional Proof-of-Authority (PoA) based distributed ledger or blockchain system, wherein one or more approved account holders, termed as "validators" associated with one or more "validator authority nodes" may provide a validation by using the respective private keys of the "validator authority nodes", wherein the validation may be regarding authenticity of each of electronic authoritative document(s) in form of the consensus proof(s).

The term "quorum of Proof-of-Authority (PoA) validator nodes" refers to a minimum number of validations or authority permission from validator nodes, required in a distributed ledger or blockchain, in order to be allowed to approve, an operation or an interaction in the distributed ledger or blockchain.

The term "block header(s)" refers to a long string in a block of a distributed ledger or blockchain, wherein the block header(s) include attributes related to various aspects of the block, and is used to identify a particular block by hashing (i.e., using a mathematical function for conversion of a numerical value into another compressed numerical output). The "block header(s)" may include a set of public keys corresponding to "validator authority nodes" in the distributed ledger that may provide validation by using the respective private keys of the "validator authority nodes".

The term "Proof of Authority (PoA) trust anchor" refers to a set of public keys that may be related to the signing authority or "validator authority nodes" in a Proof of Authority (PoA) based distributed ledger.

FIG. 1 illustrates generally but not by the way of limitation, among other things, an exemplary architecture/system 100 in which various embodiments may operate. The exemplary architecture/system 100 includes a computing device 112 for secure authentication and authorization between a user device 104 and an Internet of Things (IoT) device 108, which may be implemented according to an embodiment herein. As illustrated, a user 102 may be associated with the user device 104 in a network implementation, and the user device 104 may communicate with the IoT device 108 over a communication interface. The IoT device 108 may be associated with an asset 106 such that the IoT device 108 may be integrated with the asset 106 or coupled or embedded therein. The user device 104 may communicate with the computing device 112 through a network 110, wherein the computing device 112, may be linked or operatively connected to a distributed ledger 114. In an embodiment, the distributed ledger 114 may be a blockchain in an example.

In an implementation, the user device 104 may be accessed by applications residing on any operating system, including but is not limited to, Android™, iOS™, and the like. In an embodiment, the user device 104 may include, but is not limited to, any of a smartphone, a mobile electronic device, and a smart computing device. The term "a smart computing device" refers to any computing device that may be connected to other devices or networks via various wireless protocols, and may operate interactively or independently. In a preferred embodiment, the user device 104 may be mobile phones associated with input devices. The user device 104 may not be restricted to the mentioned devices and various other devices may be used.

An embodiment herein provides a system for secure authentication and authorization between the user device 104 and the Internet of Things (IoT) device 108 that is associated with the asset 106. As illustrated in FIG. 1, the system may include one or more computing devices 112 and a blockchain system configured to host a distributed ledger 114 or blockchain, the distributed ledger 114 or blockchain being accessible by each of the computing devices. The one or more computing devices 112 may include one or more processors coupled with a memory, the memory storing instructions which when executed by the one or more processors cause the system to onboard, an identity of the user device 104 using the computing device 112, at least based on public key identity of the user device 104; onboard, using the computing device 112, an identity of the user 102 of the user device 104 based on an electronic user identity authoritative document that is subsequently stored by the computing device 112 on the distributed ledger 114 or blockchain; onboard, using any of the user device 104 or the computing device 112, an identity of the IoT device 108 and an identity of the asset 106 in a manner such that association between the asset 106 and the IoT device 108 is endorsed on the distributed ledger 114 or blockchain based on a signature generated by the user device 104 using its respective private key, the endorsement further establishing relationship between the user 102 and the asset 106; and facilitate, through the computing device 112, the user device 104 to retrieve a first set of data packets representative of any or a combination of relevant authoritative document(s), associated consensus proof(s), and block header(s) from the distributed ledger 114 or blockchain. The onboarding of the IoT device identity may include storing public key identity of the IoT device 108, and updating a PoA trust anchor block height for the IoT device 108. The first set of data packets may be used by the user device 104 to assert and verify relationships between any or a combination of user device identity, user identity, persona granted to the user 102 over the asset 106, the asset 106 and associated IoT device identity; to verify the associated consensus proof(s) for each retrieved authoritative document against the respective block header(s); and to verify the block header(s) against PoA blockchain trust anchor so as to update the block header(s). The term "persona" or "owner persona" refers to a status corresponding to ownership of the user 102 over an asset 106.

In an embodiment, the user device 104 can include a touch pad, touch enabled screen of a computing device, an optical sensor, an image scanner and the like that can be used to receive or send information or document related to user identity or user device identity that forms part of an input to the computing device 112, for the onboarding step. In another embodiment, the received information related to onboarding can be obtained from a database that may have stored the required information or documents related to the user identity or the user device identity.

In an embodiment, the onboarded user device 104 may be mapped with the onboarded user 102, wherein the mapping may be performed by comparing a set of electronic documents, stored previously by the user 102. In an aspect, the IoT device 108 may be coupled or integrated with the asset 106, or embedded therein. The asset 106 may be, but is not limited to, any of a vehicle, home, factory, office, building, residential property, or any part thereof. In an embodiment, the IoT device 108 may be a low-powered and resource constrained IoT device 108. The term "resource constrained IoT device" refers to an IoT device 108 having limited processing and storage capabilities, which may operate on a set of limited batteries". In an exemplary embodiment, the IoT device 108 may include, but is not limited to, any of a microcontroller and an electronic control unit (ECU). Various other types of IoT devices may also be used.

In an aspect, wherein, when the IoT device 108 may be working in an offline environment, the user device 104 may connect with the IoT device 108 over an available communication interface so as to authenticate itself by sending over a second set of data packets required for the IoT device 108, wherein the second set of data packets may be selected from the first set of data packets. The IoT device 108 may verify the authenticity and integrity of the received second set of data packets, wherein the verification may include verifying relationships between the relevant authoritative document(s) and the private key identity of the IoT device 108. The IoT device 108 may verify, using the second set of data packets, consensus proofs for each authoritative document against the respective block header(s). The IoT device 108 may verify the block header(s) against the PoA blockchain trust anchor so as to update the block header(s).

In an embodiment, the user device 104 may be configured to connect with the IoT device 108 over the communication interface for receiving public key identity of the IoT device 108 and PoA trust anchor block height for the IoT device 108, prior to transmitting of second set of data packets by the user device. The communication interface may be selected from, but is not limited to, any of a Bluetooth® low energy (BLE) device, near field communication (NFC) device, radio frequency (RF) device, ultra wideband (UWB) device, and Controller Area Network bus (CAN bus) device. Various other types of interface may also be used.

In an embodiment, the IoT device 108 may be onboarded by using any of the user device 104 or the computing device 112, to endorse association between the asset 106 and the IoT device 108 endorsed on the distributed ledger 114 or blockchain. The endorsing of the association may be performed by the user device 104 by means of a signature generated by the user device 104 using its respective private key, wherein the onboarding may also enable storing the public key of the IoT device 108 in relevant authoritative document(s), retrieved as the first data packets by the user device 104. In an embodiment, the system 102 can comprise a presentation unit (not shown) that may be configured to display the status of any of the onboarding steps. In an embodiment, the user 102 and the asset 106 may be represented through multiple devices.

Figure 2:
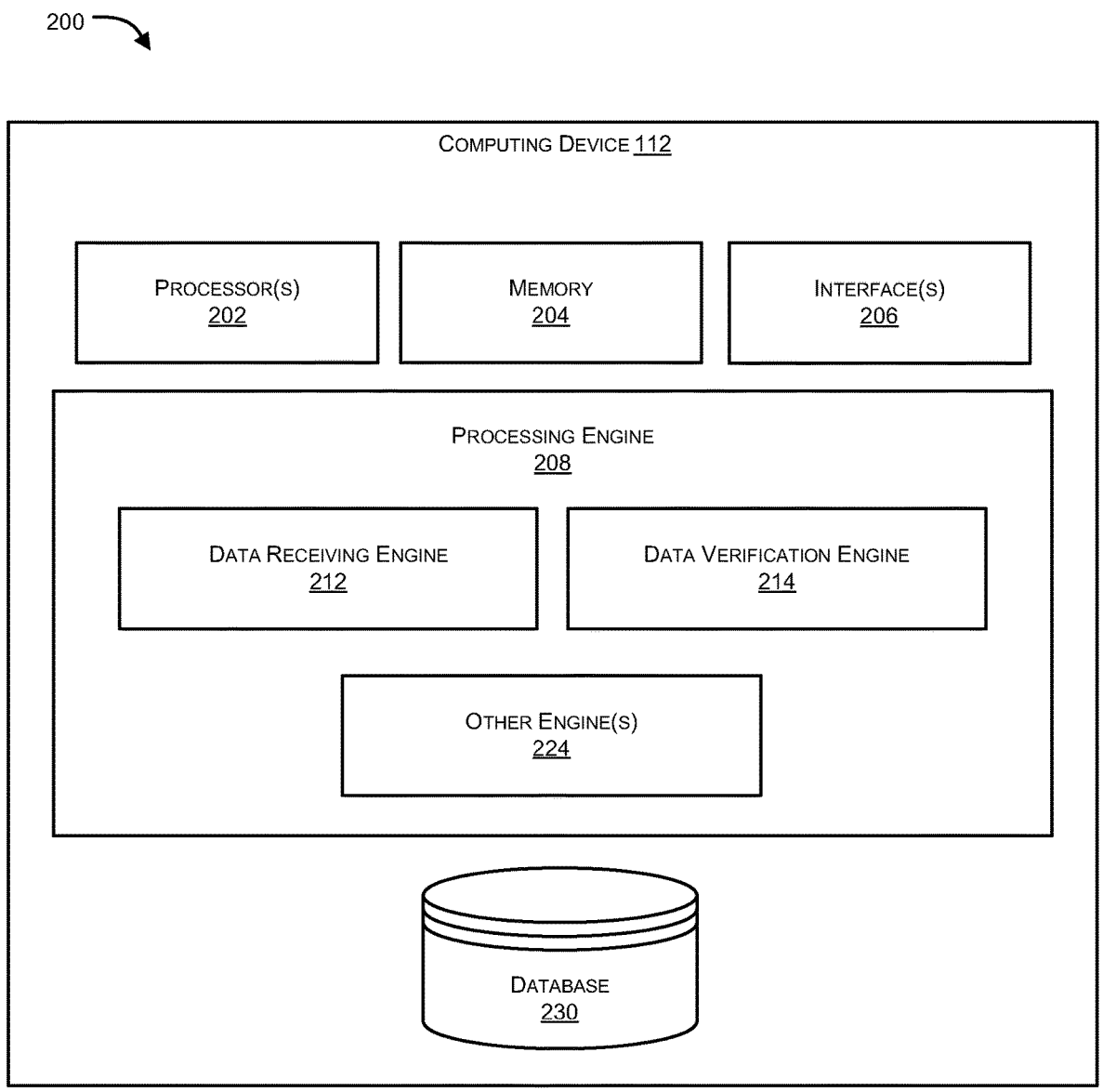
FIG. 2 illustrates an exemplary representation for a computing device of FIG. 1, according to an embodiment herein.

FIG. 2, with reference to FIG. 1, illustrates an exemplary representation 200 for the computing device 112 of FIG. 1, according to an embodiment herein. In an aspect, the computing device 112 may comprise one or more processor(s) 202. The one or more processor(s) 202 may be implemented as one or more microprocessors, microcomputers, microcontrollers, digital signal processors, central processing units, logic circuitries, and/or any devices that process data based on operational instructions. Among other capabilities, the one or more processor(s) 202 may be configured to fetch and execute computer-readable instructions stored in a memory 204 of the system 102. The memory 204 may be configured to store one or more computer-readable instructions or routines in a non-transitory computer readable storage medium, which may be fetched and executed to create or share data packets over a network service. The memory 206 may comprise any non-transitory storage device including, for example, volatile memory such as RAM, or non-volatile memory such as EPROM, flash memory, and the like.

According to an embodiment herein, the computing device 112 may include an interface(s) 206. The interface(s) 206 may comprise a variety of interfaces, for example, interfaces for data input and output devices, referred to as I/O devices, storage devices, and the like. The interface(s) 206 may facilitate communication of the computing device 112. The interface(s) 206 may also provide a communication pathway for one or more components of the computing device 112. Examples of such components include, but are not limited to, processing engine(s) 208 and database 230.

The processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the computing device 112 may comprise the machine-readable storage medium storing the instructions and the processing resource to execute the instructions, or the machine-readable storage medium may be separate but accessible to the computing device 112 and the processing resource. In other examples, the processing engine(s) 208 may be implemented by electronic circuitry. The processing engine 208 may include one or more engines selected from any of a data receiving engine 212, a data verification engine 214 and other engines 224 for processing one or more instructions. In an embodiment, the data receiving engine 214 may be configured to receive data packets or information at the computing device 112, from the user device 104 or any other device. In an embodiment, the data verification engine 214 may be configured to process data packets or information received at the computing device 112, from the user device 104 or any device.

The database 230 may comprise data that may be either stored or generated as a result of functionalities implemented by any of the components of the processing engine(s) 208 or the computing device 112. With reference to FIGS. 1 and 2, an embodiment herein refers to securing authentication and authorization between a user device 104 and an IoT device 108, wherein the data related to user identity, user device identity, identity of the IoT device 108 and asset 106, or any of relevant authoritative document including the identity of the user device 104, the user 102, the IoT device 108, and the asset 106 and the public key relevant to the user device 104 and/or the IoT device 108, may be stored in the database 230. The relevant authoritative document may include block header, as latest updated by the user device 104 at blockchain end. In an embodiment, the blockchain system may be coupled to a hardware repository for storing any data received at the backend of the distributed ledger 114 or blockchain.

Figure 3:
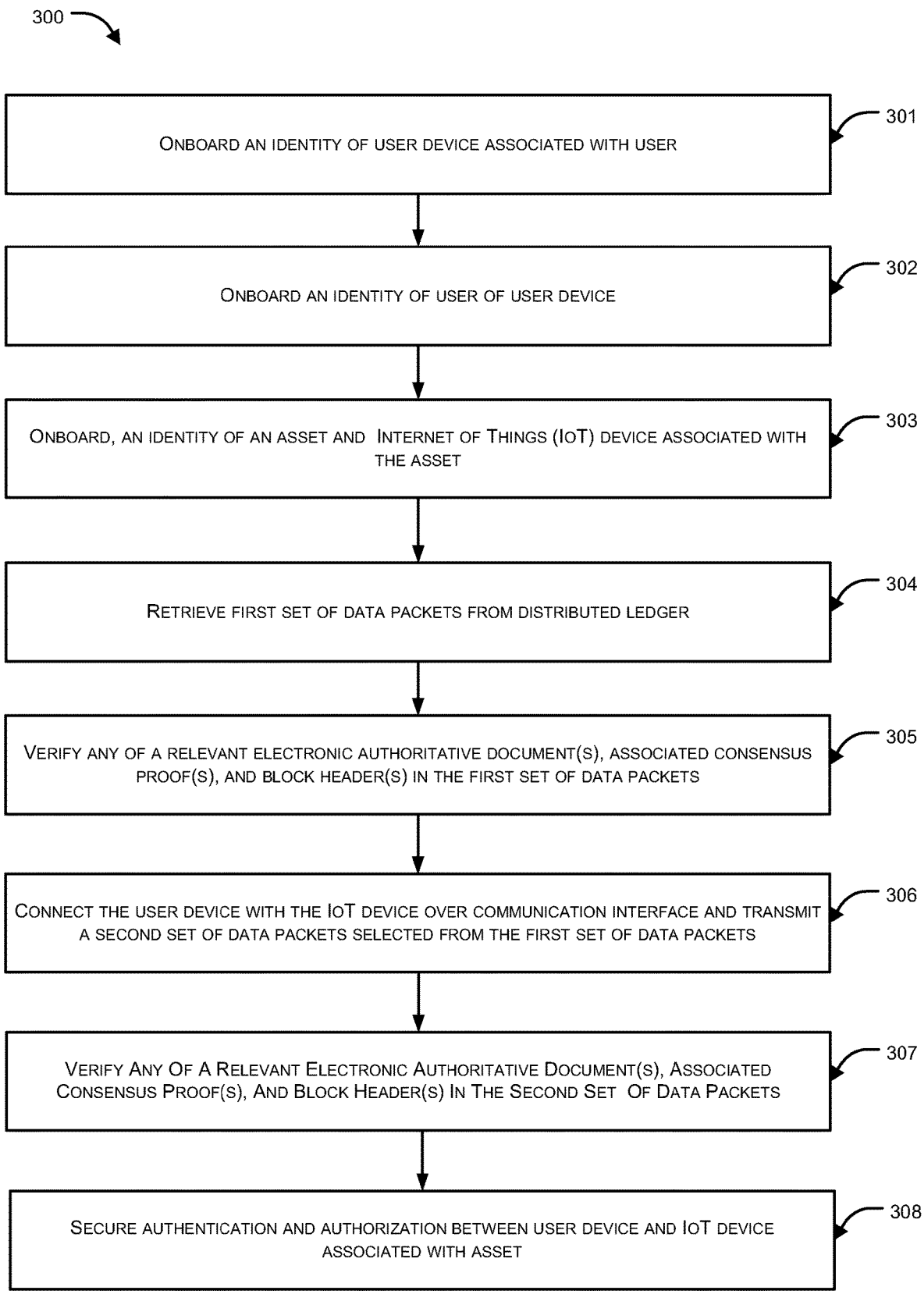
FIG. 3 illustrates a flow diagram depicting an exemplary representation of a method for secure authentication and authorization between user device and an IoT device that is associated with an asset, according to an embodiment herein.

FIG. 3, with reference to FIGS. 1 and 2, illustrates a flow diagram depicting an exemplary representation of a method for secure authentication and authorization between user device 104 and IoT device 108 associated with asset 106, using computing device 112 of FIG. 1, according to an embodiment herein. With reference to FIG. 3, an embodiment herein, provides a method 300 including the following steps. At 301, the method 300 includes the step of onboarding, using the computing device 112 having one or more processors that may be operatively associated with a distributed ledger 114, identity of user device 104 with a user 102, at least based on a public key identity of the user device 104. At 302, the method 300 includes the step of onboarding, using the computing device 112, identity of the user 102 of the user device 104, based on an electronic user identity authoritative document that may be stored by the computing device 112 on the distributed ledger 114, wherein the onboarded user device may be mapped with the onboarded user 102. In an embodiment, the distributed ledger 114 may be a blockchain.

At 303 of FIG. 3, the method 300 includes the step of onboarding, using any of the user device 104 and the computing device 112, an identity of the IoT device 108 and the asset 106, in a manner such that association between the asset 106 and the IoT device 108 is endorsed on the distributed ledger 114 based on an electronic signature generated by the user device 104 using its respective private key, wherein the endorsement may further establish a relationship between the user 102 and the asset 106. The step of onboarding of the identity of the IoT device 108 may include storing a public key identity of the IoT device 108, and updating a PoA trust anchor block height for the IoT device 108. At 304, the method 300 includes the step of facilitating, though the computing device 112, the user device 104 to retrieve a first set of data packets representative of any of a relevant authoritative document(s), associated consensus proof(s), and block header(s) from the blockchain. At 305, the method 300 includes verifying any of a relevant electronic authoritative document(s), associated consensus proof(s), and block header(s) in the first set of data packets. In an embodiment, the first set of data packets may be used by the user device 104 for asserting and verifying relationships between any of a user device identity, user identity, persona granted to the user 102 over the asset 106, the asset 106 and associated identify of the IoT device 108, verifying the associated consensus proof(s) for each retrieved authoritative document against the respective block header(s) and verifying the block header(s) against a PoA blockchain trust anchor so as to update the block header(s).

In an aspect, when the IoT device 108 may be working in an offline environment, the method may include further steps related to connection of user device 104 to IoT device 108 as well as authentication and authorization of the user device 104. At 306, the method 300 includes a step of connecting the user device 104 with the IoT device 108 over an available communication interface so as to authenticate itself by transmitting a second set of data packets to the IoT device 108, wherein the second set of data packets may be selected from the first set of data packets. At 307, the method 300 includes the step of verifying, at the IoT device 108, an authenticity and integrity of the received second set of data packets, the verification comprising verifying relationships between the relevant authoritative document(s) and a private key identity of the IoT device 108; verifying, at the IoT device 108, using the second set of data packets, consensus proofs for each authoritative document against the respective block header(s); and verifying, at the IoT device 108, the block header(s) against the block header of PoA blockchain trust anchor so as to update the block header(s). At 308, the method 300 includes the step of successful authentication and authorization between the user device 104 and the IoT device 108, based on the success of the previous steps.

Figure 4:
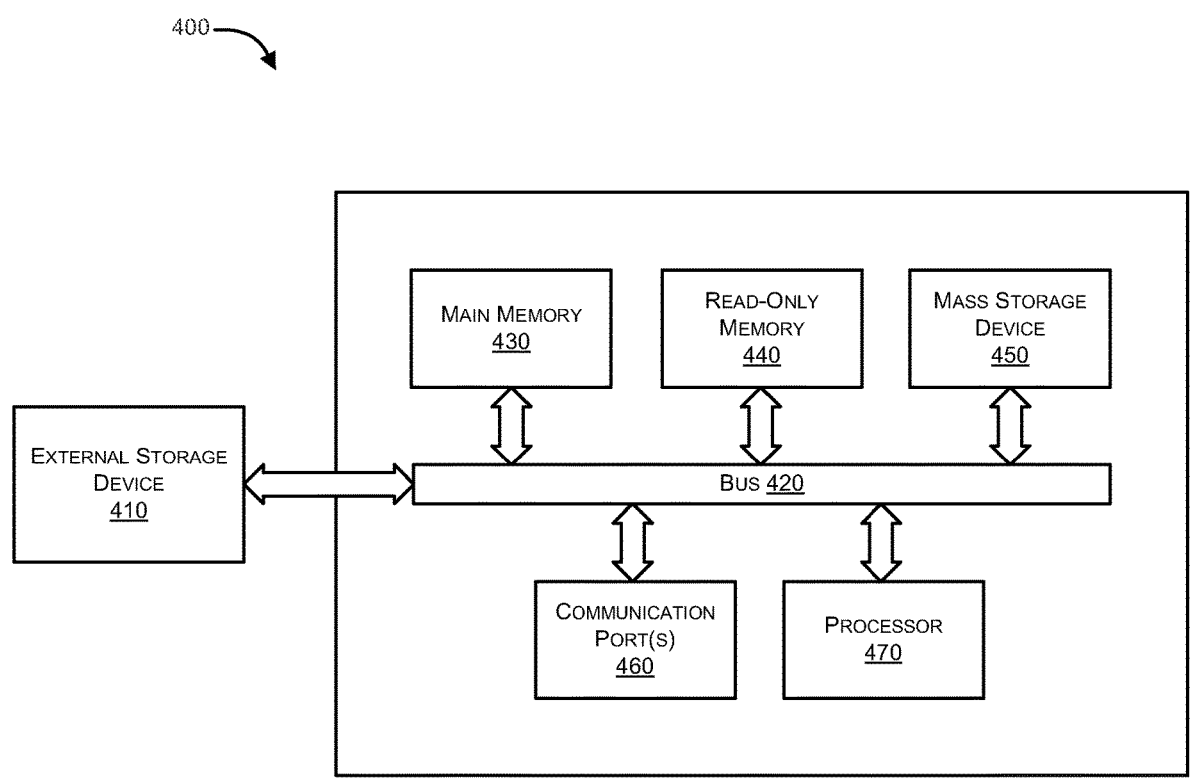
FIG. 4 illustrates an exemplary computer system in which or with which embodiments herein may be utilized.

FIG. 4, with reference to FIGS. 1 through 3, illustrates an exemplary computing system 400 in which or with which embodiments herein may be utilized. As shown in FIG. 4, computing system 400 can include an external storage device 410, a bus 420, a main memory 430, a read only memory 440, a mass storage device 450, communication port 460, and a processor 470. A person skilled in the art will appreciate that the computer system 400 may include more than one processor and communication ports. Examples of processor 470 include, but are not limited to system on chip processors or other types of processors. Processor 470 may include various modules associated with embodiments herein. Communication port 460 can be any of an RS-232 port for use with a modem based dialup connection, a 10/100 Ethernet port, a Gigabit or 10 Gigabit port using copper or fiber, a serial port, a parallel port, or other existing or future ports. Communication port 460 may be chosen depending on the network 110, such a Local Area Network (LAN), Wide Area Network (WAN), or any network to which computer system connects.

Memory 430 can be Random Access Memory (RAM), or any other dynamic storage device commonly known in the art. Read-only memory 440 can be any static storage device(s) e.g., but is not limited to, a Programmable Read Only Memory (PROM) chips for storing static information e.g., start-up or BIOS instructions for processor 470. Mass storage 450 may be any type of mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g. an array of disks (e.g., SATA arrays).

Bus 420 communicatively couples processor(s) 470 with the other memory, storage and communication blocks. Bus 420 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 470 to a software system.

Optionally, operator and administrative interfaces; e.g. a display, keyboard, and a cursor control device, may also be coupled to bus 420 to support direct operator interaction with a computer system. Other operator and administrative interfaces can be provided through network connections connected through communication port 460. The external storage device 410 can be any kind of external hard-drives, floppy drives, zip drives, Compact Disc-Read Only Memory (CD-ROM), Compact Disc-Re-Writable (CD-RW), and Digital Video Disk-Read Only Memory (DVD-ROM). Components described above are meant only to exemplify various possibilities. In no way should the aforementioned exemplary computer system limit the scope of the embodiments herein.

Figure 5:
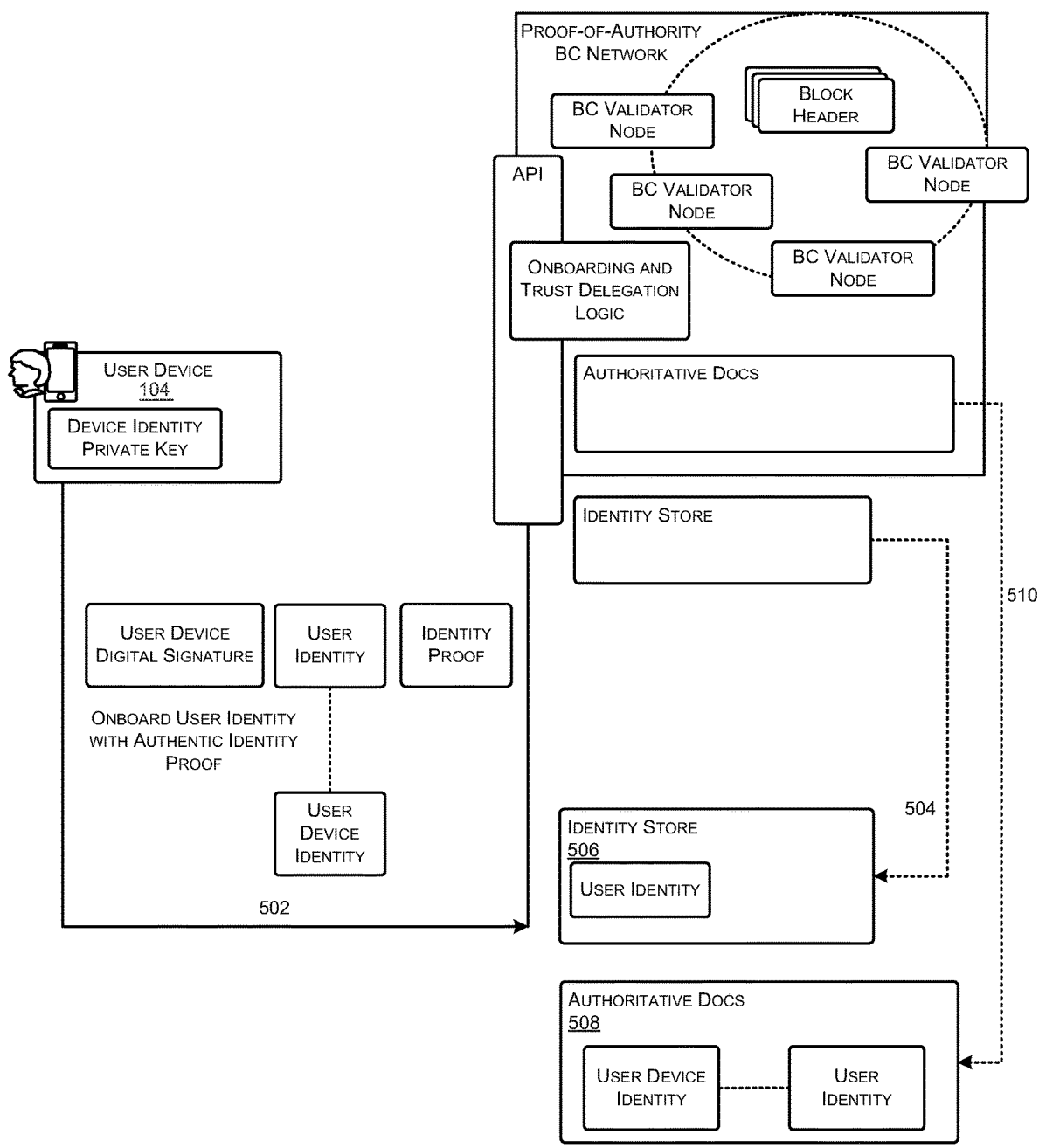
FIG. 5 illustrates an exemplary representation of onboarding step of a user device and a user, according to an embodiment herein.

FIG. 5, with reference to FIGS. 1 through 4, illustrates an exemplary representation of onboarding of identity of a user device 104 and a user 102, according to an embodiment herein. In an aspect, and as illustrated in FIG. 5, the user device 104 with the user 102 may be onboarded, at least based on a public key identity of the user device 104, using a computing device 112 having one or more processors that are operatively associated with the distributed ledger 114, as shown in 502. In an aspect, the user 102 may provide an identity proof which may be verified, and stored in the form of an electronic authoritative document on the distributed ledger 114, for initiating the onboarding of the user 102 and the user device 104. Upon completion of onboarding of the user device 104 and the user 102 as shown in 502, a set of electronic authoritative documents 508 may be generated that may include one or more attributes related to the user device identity and the user identity.

In an embodiment, the set of electronic authoritative documents 508 may be generated separately for each attribute related to the user device identity and the user identity, in the form of an electronic user device identity authoritative document(s) and an electronic user identity authoritative document, respectively. In an embodiment, the identity proof and/or electronic user identity authoritative document may be associated with a user identity attribute selected from any of a phone number, an email address, a driver license number, a social security number, and a unique user identity number. The electronic user identity authoritative document may not be limited to the mentioned attributes or identity documents, and various other attributes or documents may be used for onboarding the user 102. In an embodiment, the user device 104 may be onboarded based on the public key identity of the user device 104, wherein the corresponding private key may be stored in the user device 104, for generating the electronic user device identity authoritative document. The electronic authoritative document may represent the user identity and various identity attributes backed by the identity proof provided by the user 102.

The set of electronic authoritative document(s) 508, generated in any step, may be stored by the computing device 112 on the distributed ledger 114, in the form of cryptographic digests, and may not include clear text with Personally identifiable information (PII). The cryptographic digest may refer to a cryptographic hash function having a string of digits generated with a one-way hashing formula. In an embodiment, a part of the information related to the identity proof, provided by the user 102 during onboarding, may be extracted in the form of clear text identity attributes that may be stored in a mutable identity store (506), separately from the distributed ledger 114, as shown in process 510.

Figure 6:
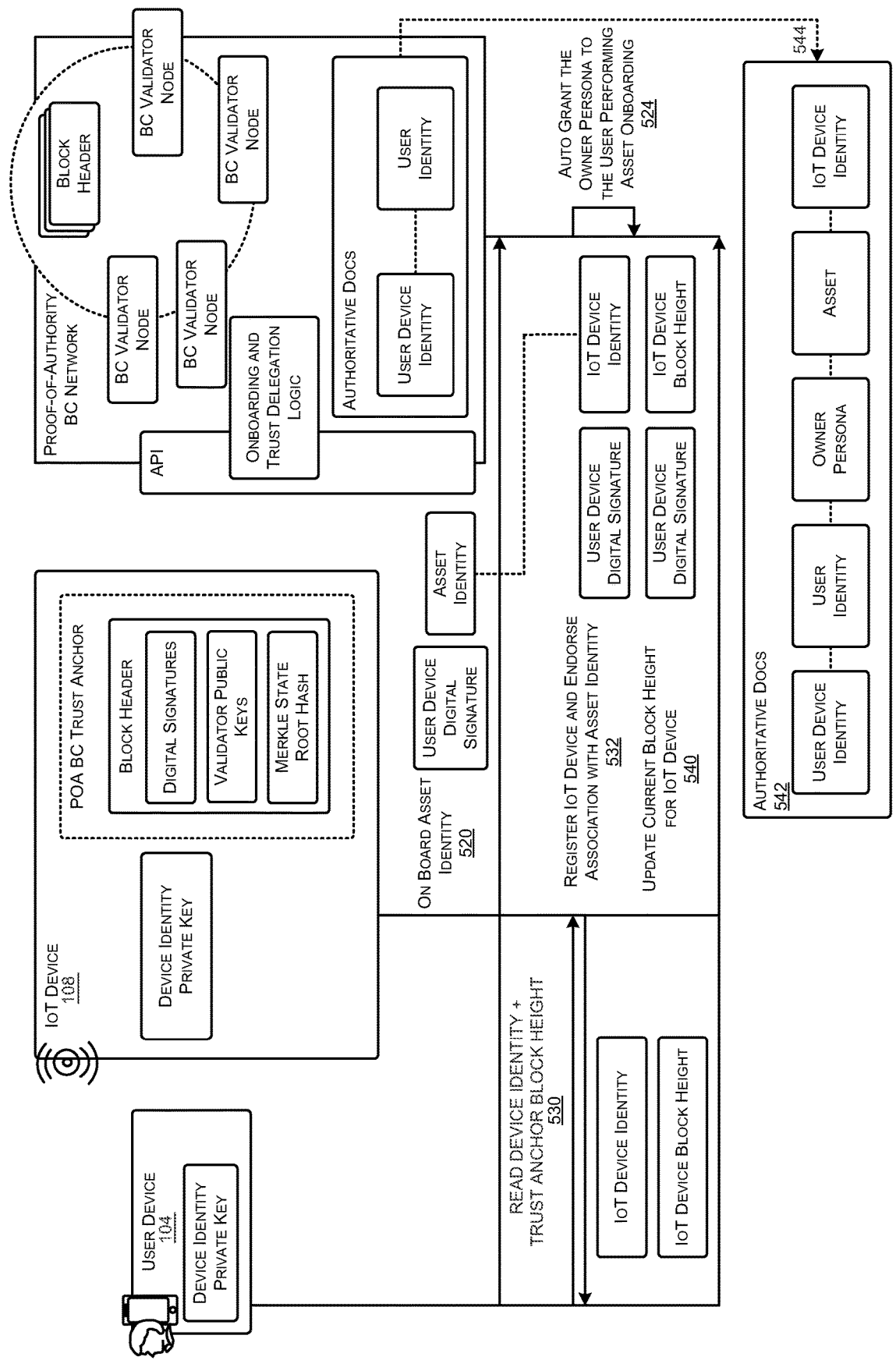
FIG. 6 illustrates an exemplary representation of onboarding step of an identity of the IoT device and an identity of the asset, according to an embodiment herein.

FIG. 6, with reference to FIGS. 1 through 5, illustrates an exemplary representation of the onboarding step of an identity of the IoT device 108 and asset 106, using the computing device 112, according to an embodiment herein. In an example, and as illustrated in FIG. 6, identity of an asset 106 may be onboarded, by using any of the user device 104 and computing device 112, based on an electronic signature generated by the user device 104 using its respective private key. This may establish a relationship between the user 102 and the asset 106. Upon onboarding identity of an asset 106, as shown in 520, the user 102 may be automatically granted the title of "owner persona" as shown in 524, thus establishing the relationship between the user 102 and the asset 106. The user 102 may receive the identity of the IoT device 108, associated with the asset 106, as shown in 530, over a communication interface. In an embodiment, the user 102 may also receive the PoA trust anchor block height, of the IoT device 108 over the communication interface. The communication interface may be selected from, but is not limited to, any of a Bluetooth® low energy (BLE) device, near field communication (NFC) device, radio frequency (RF) device, ultra wideband (UWB) device, and Controller Area Network bus (CAN bus) device. The identity of an IoT device 108, may be onboarded, as shown in 532, by using any of the user device 104 and computing device 112, which may establish a relationship between the user 102 and the asset 106, by endorsing the association between the asset 106 and the IoT device 108 on the distributed ledger 114 based on an electronic signature generated by the user device 104 using its respective private key. Upon successful onboarding of the identity of the IoT device 108 and the asset 106, a set of verifiable electronic authoritative document(s) 542 may be generated as shown in process 544 that may include one or more attributes, related to any of the user identity, user device identity, owner persona, identity of IoT device 108 and the identity of asset 106. In an embodiment, the electronic authoritative document (s) 542 may be stored by the computing device on the distributed ledger 114 or blockchain, in the form of cryptographic digests, and may not include clear text with Personally identifiable information (PII).

In an aspect, the onboarding of the identity of the IoT device 108 may include storing the public key identity of the IoT device 108, wherein the user device private key may be used to generate a signature for the messages sent to the distributed ledger 114 or Blockchain, which may be verified by trust delegation logic against the previously onboarded user device identity public key. In an aspect, the user device 104 may also update the current PoA trust anchor block height for the IoT device 108, to enable a secondary user device 104 or a guest user device to download the required set of block headers, for secure authentication.

Figure 7:
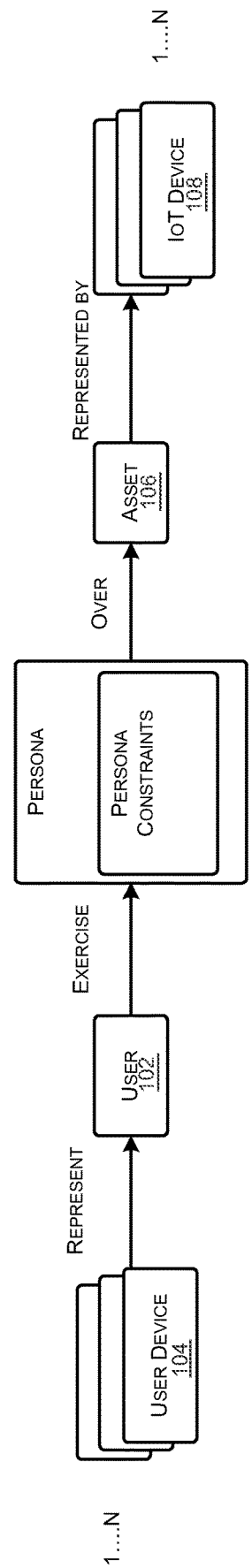
FIG. 7 illustrates an exemplary representation of a data model that represents an established relationship between a user, user device, persona status, IoT device and asset, according to an embodiment herein.

In an aspect, the steps of onboarding the user 102, user device 104, identity of the IoT device 108, and asset 106, may result in generation of the set of verifiable electronic authoritative documents 542 on the distributed ledger 114. The electronic authoritative documents may comply with the data model as illustrated in FIG. 7, with reference to FIGS. 1 through 6, wherein auto granting of the "owner Persona" title may establish the Persona relationship between the user 102 and the asset 106, which may keep the relationship intact even as the originally onboarded user device changes. This may be useful in scenarios where the user 102 loses the user device 104, and the identity related to the original user device 104 may be easily recovered due to the aforementioned established relationship, thereby avoiding the need to undertake additional steps or action to reassert the Persona status over the asset 106. In an embodiment, the user 102 and the asset 106 may be represented through multiple devices. More particularly, the user 102 may be represented through multiple user devices, and/or the asset 106 may be represented through multiple IoT devices.

Figure 8A:
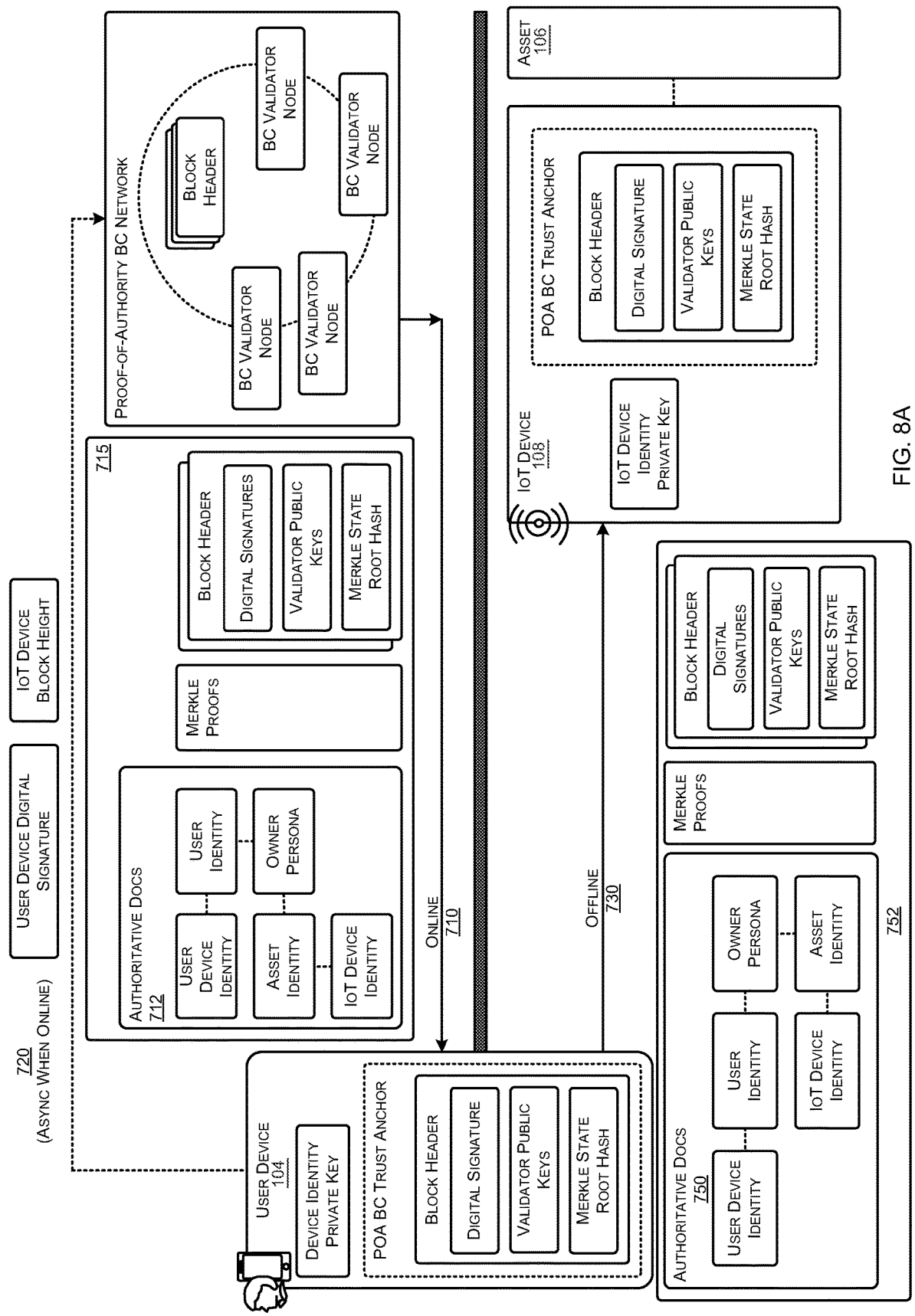
FIG. 8A illustrates an exemplary representation of a step related to retrieval of first set of data packets by user device and step of transmitting of second set of data packets to the IoT device, according to an embodiment herein.

FIG. 8A, with reference to FIGS. 1 through 7, illustrates an exemplary representation of step 710 of facilitating the user device 104 to retrieve a first set of data packets 715 through computing device 112 and step 730 of transmitting second step of data packets to the IoT device 108, for authentication of the user device 104. In an aspect, and as illustrated in FIG. 8A, in step 710, the user device 104 may retrieve the first set of data packets, that may be facilitated, through the computing device 112. In an aspect, when the user device 104 may retrieve the block headers from the distributed ledger 114, the user device 104 may provide the current PoA trust anchor block height of its own trust anchor as a parameter, as shown in step 720, wherein the distributed ledger 114 may recognize the user 102 as well as the IoT device trust anchor block height and provide the required set of block headers to the user device 104. In an aspect, the set of block header(s) retrieved by the user device 104, in the first set of data packets, may include a combined set of headers associated with the user device 104 and the IoT device 108, wherein the combined set of headers may include headers related to an authority node change as well as a header, which backs the authoritative documents and consensus proofs. The combined set of headers may be a key to ensure offline authentication and authorization between the user device 104 and the IoT device 108 as the IoT device 108 may not be connected to a network 110 and therefore may be unable to download its own block headers and thus may rely on the user device 104 to pass on the necessary block headers required for the authentication and authorization.

Figure 8B:
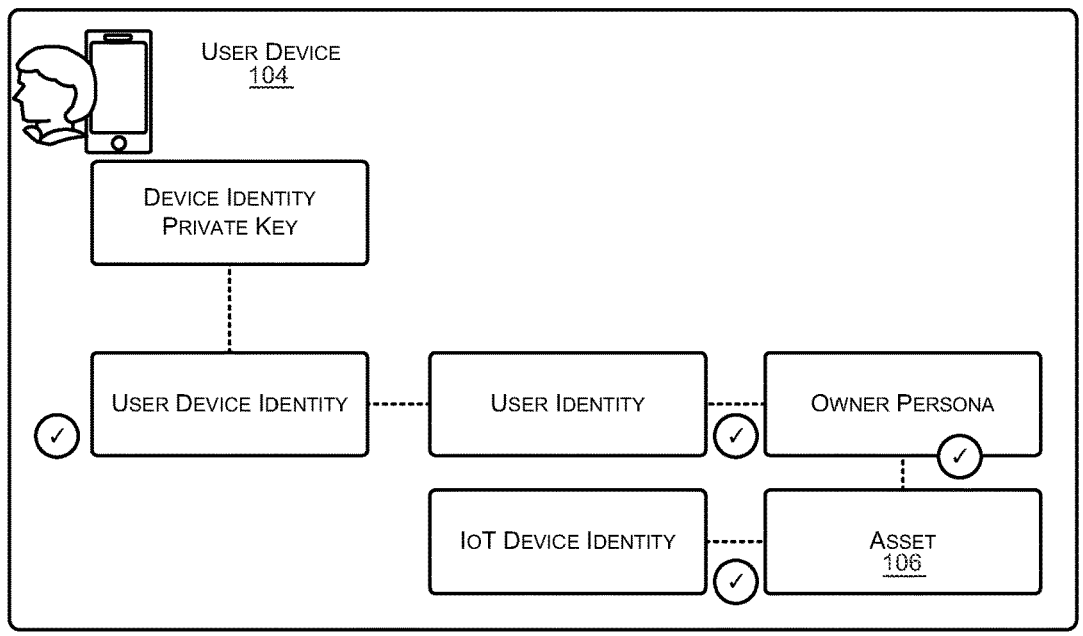
FIG. 8B illustrates an exemplary representation of a verification of first set of data packets by user device for asserting and verifying relationships between the private key identity of the user device and the relevant electronic authoritative document(s), according to an embodiment herein.

In an aspect, the first set of data packets 715 may be representative of any of a relevant electronic authoritative document(s) 712, associated consensus proof(s), and block header(s) from the distributed ledger 114. In an aspect, the first set of data packets, retrieved by the user device 104, may be analyzed or verified in one or more steps. In an embodiment, the first set of data packets, may be used by the user device 104 for asserting and verifying relationships between the private key identity of the user device 104 and the relevant electronic authoritative document(s) associated with any of user device identity, user identity, a persona status granted to the user 102 over the asset 106, the asset 106 and the identity of the IoT device 108, as illustrated in an exemplary representation in FIG. 8B, with reference to FIGS. 1 through 8A. In an aspect, the user device 104 may perform the step of asserting and verifying the relationships by parsing the information or data in the first set of data packets and verifying the relationships between the electronic authoritative documents and the private key identity of the user device 104. The electronic authoritative document associated with the user device identity may have an identity reference to the electronic authoritative document associated with the user identity, the electronic authoritative document associated with the persona document may have an identity reference to both the electronic authoritative document associated with the user identity and the electronic authoritative document associated with asset 106, the electronic authoritative document associated with the IoT device identity may have an identity reference to the electronic authoritative document associated with the asset 106, and the public key contained in the electronic authoritative document associated with the user device identity may be the counterpart for the private key of the user device 104.

Figure 8C:
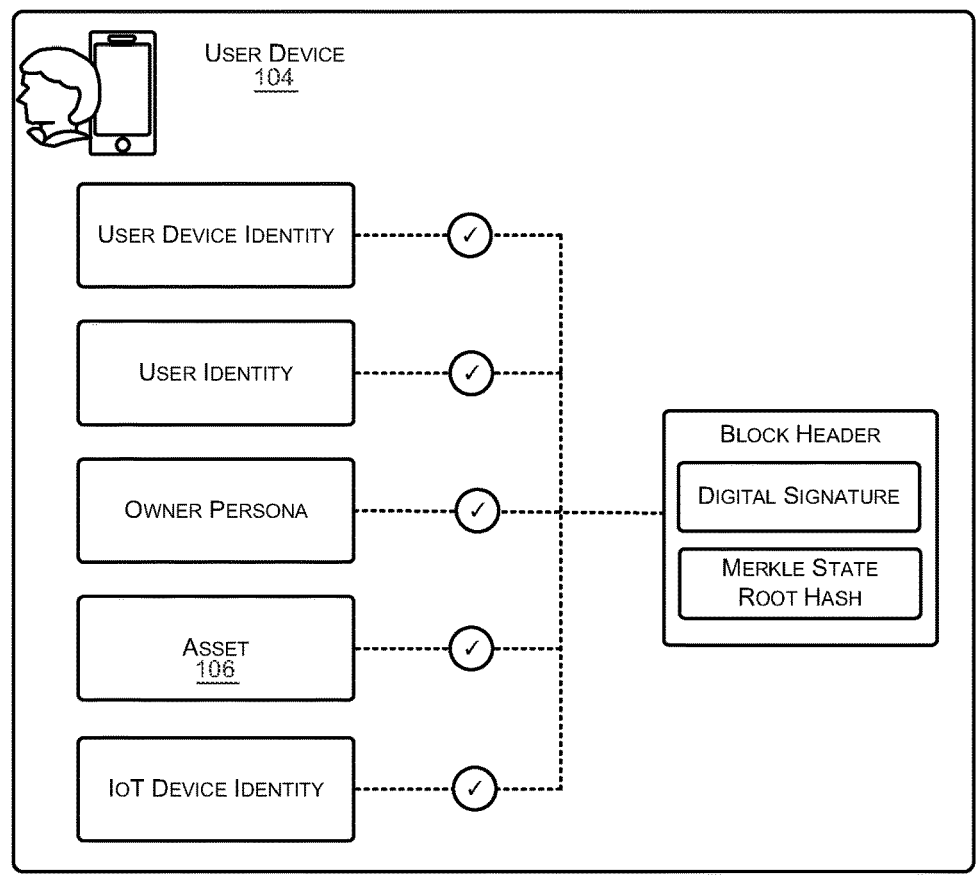
FIG. 8C illustrates an exemplary representation of a verification of associated consensus proof(s) for each retrieved authoritative document at user device, according to an embodiment herein.

In an embodiment, the first set of data packets may be used by the user device 104 for verifying the associated consensus proof(s) for each retrieved authoritative document against the respective latest block header(s) downloaded from the distributed ledger 114 or blockchain, as illustrated in an exemplary representation in FIG. 8C, with reference to FIGS. 1 through 8B. The consensus proof(s) may be verified for the electronic authoritative document related to any of a user device identity, user identity, persona, the identity of the IoT device 108, and asset 106. The verification may be successful if each private key associated with a "validator authority node" used for signing or proofing the authoritative document, may match with the corresponding public keys of the "validator authority node" in the latest block header, downloaded from the distributed ledger 114 or blockchain.

Figure 8D:
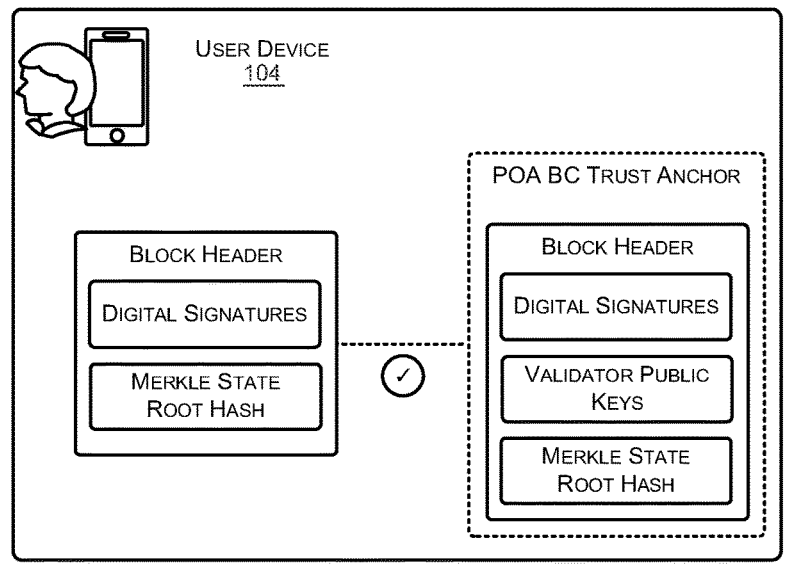
FIG. 8D illustrates an exemplary representation of a verification of incoming block header(s) against block header of PoA blockchain trust anchor of user device, according to an embodiment herein.

In an embodiment, the first set of data packets, may be used by the user device 104 for verifying the block header(s) against the block header of PoA blockchain trust anchor, of the user device 104, so as to update the block header(s), as illustrated in FIG. 8D, with reference to FIGS. 1 through 8C. In an embodiment, the incoming or latest block header(s) downloaded from the distributed ledger 114 or blockchain, may be verified by the user device 104 against already present block header of PoA blockchain trust anchor, by matching the public keys associated with "validator authority node" present in the latest block header(s) downloaded with the block header in the user device 104. Upon successful matching, the header of the blockchain trust anchor of the user device 104 may be updated with the newest or the latest block. The verification of the block headers, as performed in the user device 104, may be similar to the steps explained further below with respect to FIGS. 11A, 11B, and 11C.

In an aspect and as illustrated in FIG. 8A, at step 730, wherein, when the IoT device 108 may be working in an offline environment, the user device 104 may connect with the IoT device 108 over an available communication interface so as to authenticate itself by transmitting a second set of data packets 752, to the IoT device 108. In an embodiment, the user device 104 may be configured to connect with the IoT device 108 over the communication interface for receiving the public key identity of the IoT device 108 and PoA trust anchor block height for the IoT device 108, prior to transmitting of the second set of data packets by the user device 104. The second set of data packets 752 may be selected from the first set of data packets 715, and may be representative of any of a relevant electronic authoritative document(s) 750, associated consensus proof(s), and block header(s) or potential subset of the block header(s) from the distributed ledger 114. The communication interface may be selected from, but is not limited to, any of a Bluetooth® low energy (BLE) device, near field communication (NFC) device, radio frequency (RF) device, ultra wideband (UWB) device, and Controller Area Network bus (CAN bus) device.

Figure 8E:
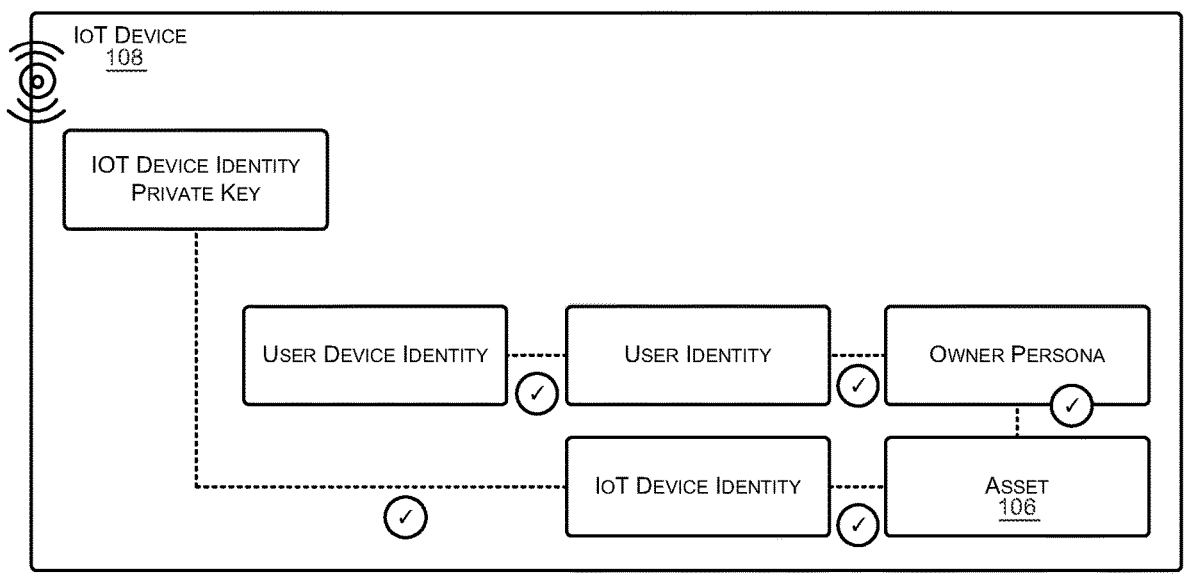
FIG. 8E illustrates an exemplary representation of verification of second set of data packets by an IoT device for asserting and verifying relationships between the private key identity of the IoT device and the relevant electronic authoritative document(s), according to an embodiment herein.

In an aspect, the second set of data packets 752, transmitted to the IoT device 108 may be analyzed or verified in one or more steps. In an embodiment, the IoT device 108 may verify the authenticity and integrity of the received second set of data packets 752, wherein the verification may include verifying relationships between the relevant electronic authoritative document(s) and a private key identity of the IoT device 108, as illustrated in FIG. 8E, with reference to FIGS. 1 through 8D. The second set of data packets, may be used by the IoT device 108 for asserting and verifying relationships between any of the user device identity, user identity, persona granted to the user 102 over the asset 106, the asset 106, and the associated identity of the IoT device 108, as illustrated in an exemplary representation in FIG. 8F, with reference to FIGS. 1 through 8E. In an aspect, the IoT device 108 may perform the step of asserting and verifying the relationships by parsing the information or data in the second set of data packets and verifying the relationships between the electronic authoritative documents and the private key identity of the IoT device 108. The electronic authoritative document associated with the user device identity may have an identity reference to electronic authoritative document associated with user identity, electronic authoritative document associated with persona document may have an identity reference to both the electronic authoritative document associated with the user identity and the electronic authoritative document associated with asset 106, electronic authoritative document associated with the IoT device identity may have an identity reference to the electronic authoritative document associated with asset 106, and the public key contained in the electronic authoritative document associated with IoT device identity may be the counterpart for the private key of the IoT device 108.

Figure 8F:
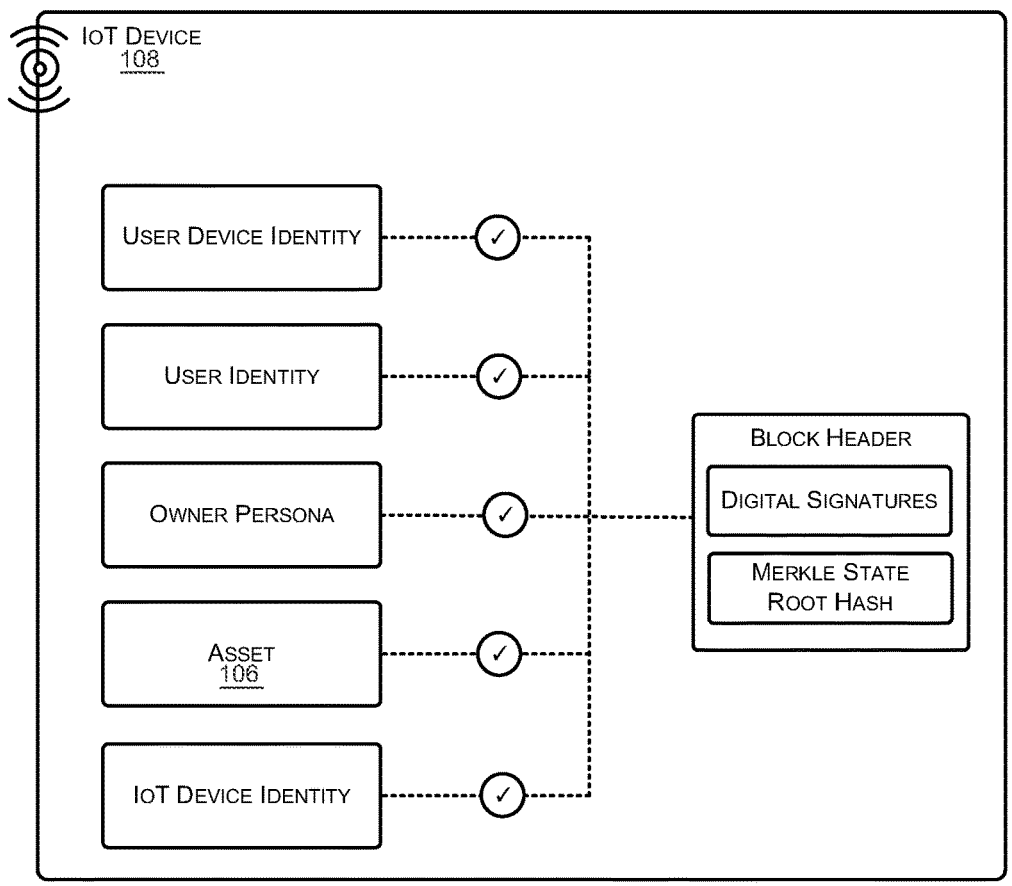
FIG. 8F illustrates an exemplary representation of a verification of associated consensus proof(s) for each retrieved authoritative document at an IoT device, according to an embodiment herein.

In an embodiment, the IoT device 108 may verify, using the second set of data packets, consensus proofs for each authoritative document against the respective block header(s), as illustrated in an exemplary representation in FIG. 8F, with reference to FIGS. 1 through 8E. The respective latest block header(s) may be the latest block headers downloaded from the distributed ledger 114 or blockchain. The consensus proof(s) may be verified by the IoT device 108 for the electronic authoritative document related to any of the user device identity, user identity, persona, the identity of the IoT device 108, and asset 106. The verification may be successful if each private key associated with the "validator authority node" used for signing or proofing the authoritative document, may match with the corresponding public keys of the "validator authority node" in the latest block header, downloaded from the distributed ledger 114 or blockchain.

Figure 8G:
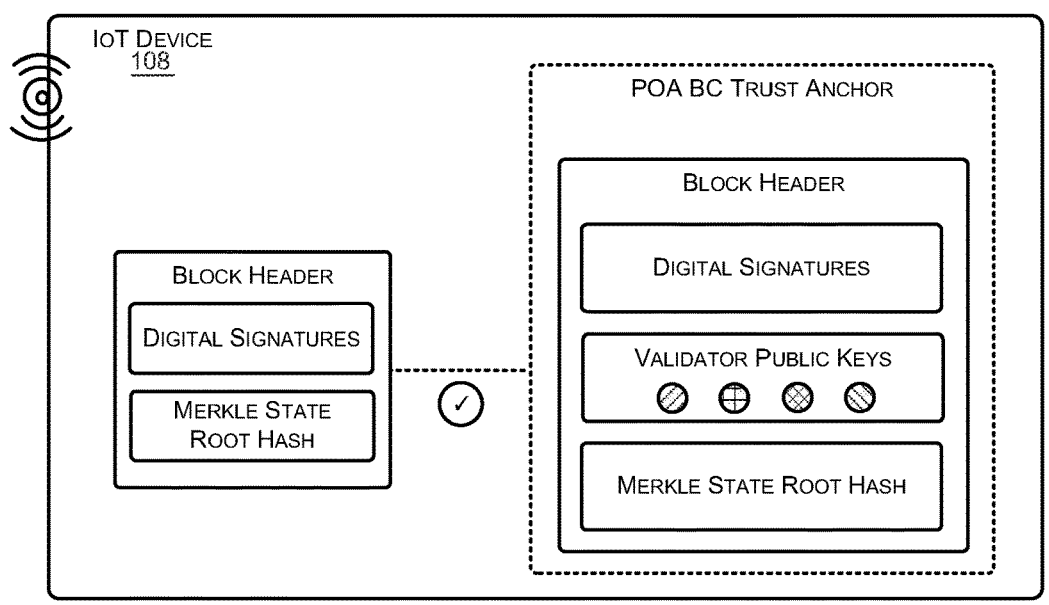
FIG. 8G illustrates an exemplary representation of a verification of an incoming block header(s) against block header of PoA blockchain trust anchor of IoT device, according to an embodiment herein.

In an embodiment, using a second set of data packets, the IoT device 108 may verify block header(s) against the block header of the PoA blockchain trust anchor so as to update the block header(s) of the IoT device 108, as illustrated in FIG. 8G, with reference to FIGS. 1 through 8F. In an embodiment, the latest block header(s) downloaded from the distributed ledger 114 or blockchain, may be verified by the IoT device 108 against an already present block header of PoA blockchain trust anchor, by matching the public keys associated with the "validator authority node" present in the latest block header(s) downloaded with the block header in the IoT device 108. Upon successful matching, the header of the blockchain trust anchor of the user device 104 may be updated with the newest or the latest block header. In an embodiment, upon successful verification of the second set of data packets by the IoT device 108, the user device 104 may update the latest block headers related to PoA blockchain trust anchor of IoT device 108, at the backend of the distributed ledger 114, so as to enable any future authentication related to a secondary user device or a guest user device. The verification of the block headers, as performed in the IoT device 108 may be similar to the steps explained further below with respect to FIGS. 11A, 11B, and 11C. Furthermore, the PoA blockchain trust anchor may be incorporated or added in the original IoT device 108, at the time of programming/setting up as explained further below with respect to FIG. 12.

Figure 8H:
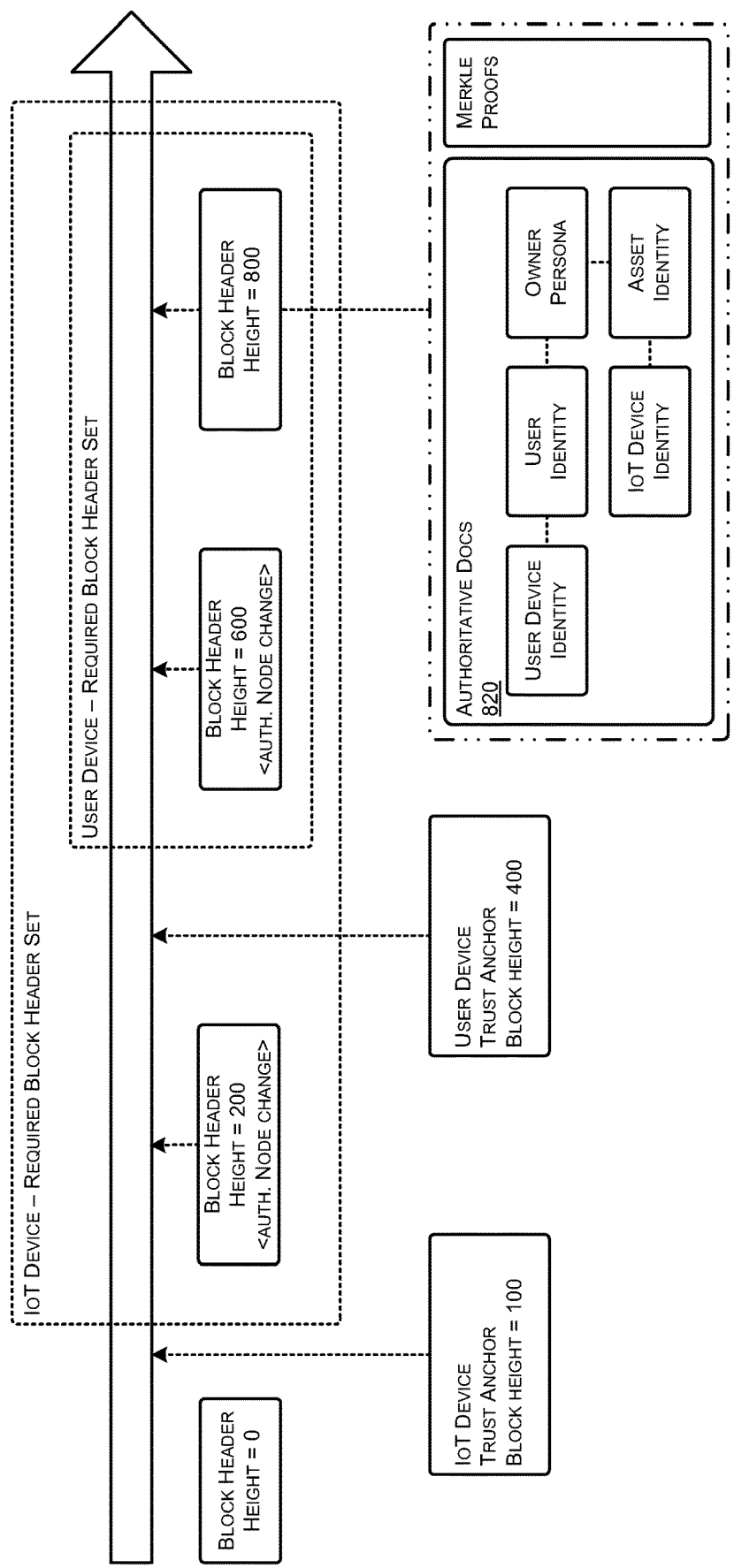
FIG. 8H illustrates an exemplary representation for updating set of block headers verification of incoming block header(s) against block header of PoA blockchain trust anchor of IoT device, according to an embodiment herein.

In an exemplary embodiment and as illustrated in FIG. 8H, with reference to FIGS. 1 through 8G, the set of block headers may vary or be updated in each method step as seen in the case of block headers of different heights as 200, 600, 800 and the like, which may be updated at the backend of the distributed ledger 114, or at the user device 104 or the IoT device 108. As shown in FIG. 8H, the block headers at height 200 and 600 may be "authority node change" headers, the header at height 800 may be the block header that backs the authoritative documents and consensus proofs, the block headers related to the IoT device 108 may be of height 200, 600, and 800, and the user device header set may include the block headers at height 600 and 800. In another exemplary embodiment, a similar model may be applied such that the user device trust anchor header height may be lower than or equal to the IoT device trust anchor header height.

In accordance with the embodiments herein, upon successful verification of the second set of data packets by the IoT device 108, a number of various steps may follow to establish or confirm secure authentication and authorization between the user device 104 and the IoT device 108, associated with an asset 106.

Figure 9A:
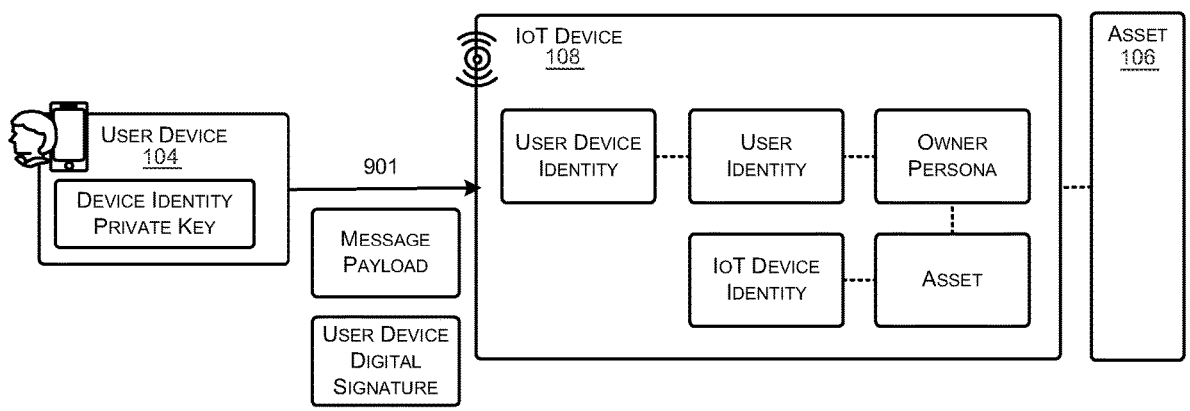
FIG. 9A illustrates an exemplary representation for transmitting a first authentication message from a user device to an IoT device, according to an embodiment herein.

In an aspect and as illustrated in step 901 of FIG. 9A, with reference to FIGS. 1 through 8H, the user device 104 may transmit a first authentication message with a first digital signature to the IoT device 108 in a manner such that the IoT device 108 may use a first public key of the user device 104 to verify the first digital signature, and may authorize the first authentication message by verifying the persona status that the authenticated user 102 is granted over the asset 106.

Figure 9B:
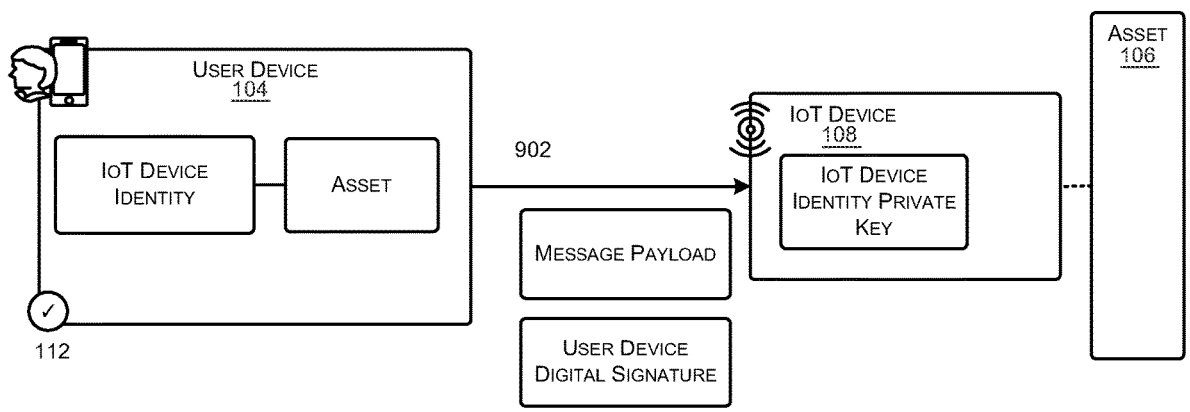
FIG. 9B illustrates an exemplary representation for transmitting a second authentication message from an IoT device to a user device, according to an embodiment herein.
Figure 9C:
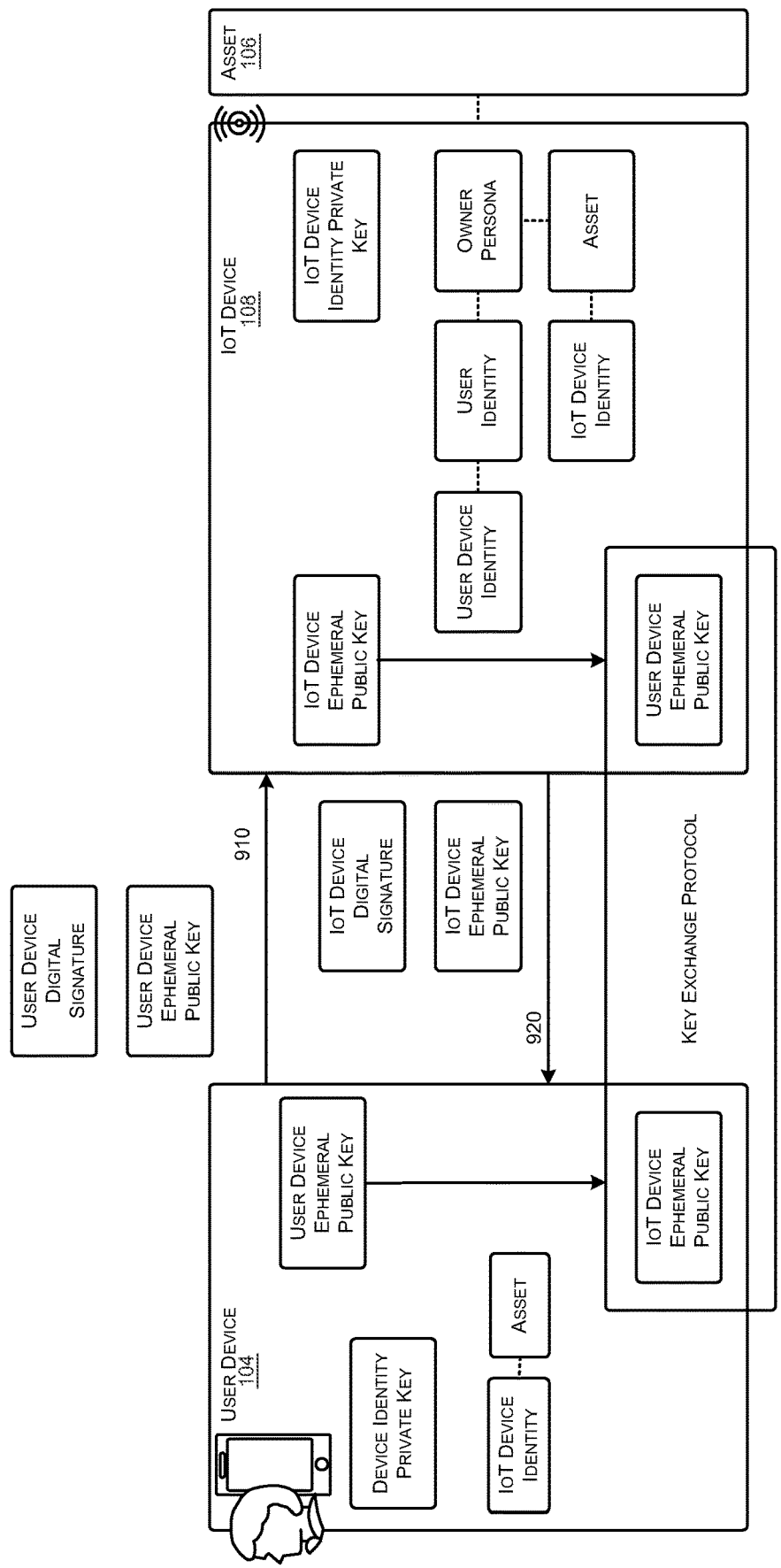
FIG. 9C illustrates an exemplary representation showing the generation and the exchange of ephemeral key between an IoT device and a user device, according to an embodiment herein.

In another aspect, the IoT device 108 may take an initiative, and may send a notification message to the user device 104. In an embodiment, the IoT device 108 may transmit a second authentication message with a second digital signature to the user device 104 in a manner such that the user device 104 may use a second public key of the IoT device 108 to verify the second digital signature and to confirm that the second authentication message originated from the IoT device 108 that is linked to the asset 106 that the user device 104 initiated contact with, as illustrated in step 902 of FIG. 9B, with reference to FIGS. 1 through 9A.

In an aspect, the authentication step, according to embodiments herein, may include the step of establishing a shared key between the user device 104 and the IoT device 108. The authentication step may be extended to establish a more battery efficient and performant symmetric key between device participants using the previously verified device identity keys on both ends. In an embodiment, the symmetric key may be ephemeral keys generated by the user device 104 and the IoT device 108, so that the ephemeral keys may be mutually authenticated using the Public Keys of the user device 104 and the IoT device 108 parsed from the authoritative documents earlier in the authentication phase. The term "ephemeral key(s)" refer to specific form of keys, which can be used for one or more times within a single session.

In an embodiment, the user device 104 may use its private key to generate a third digital signature for an ephemeral key representation, and may send both the third signature and the ephemeral key representation to the IoT device 108 (as shown in step 910 in FIG. 9C, with reference to FIGS. 1 through 9B) in a manner such that the IoT device 108 may authenticate the ephemeral key representation from the user device 104 based on the third digital signature and the first public key (of FIG. 9A).

In another embodiment, the IoT device 108 may use its private key to generate a fourth digital signature for the ephemeral key representation and transmit both the fourth digital signature and the ephemeral key representation to the user device 104 (as shown in step 930 in FIG. 9C) such that the user device 104 authenticates the ephemeral key representation from the IoT device 108 based on the fourth digital signature and a second public key (of FIG. 9B) so as to allow both the user device 104 and the IoT device 108 to have each other's ephemeral public key in their possession and have authenticated an origin of the ephemeral public key based on which standardized key exchange protocol may be enabled.

In an aspect, the user 102, using the user device 104, may endorse a second user, being a previously onboarded user, with a guest persona over the asset 106, wherein the second user may share a unique identity attribute with the user 102, and wherein the at least one attribute of the second user may be associated in the distributed ledger 114 so as to identify and authenticate the second user based on a digital signature of the second user. In an embodiment, the user 102 may endorse the second user in relation to the asset 106 based on one or more constraints, the constraints being selected from any of a time of access, location of access, and one or more allowed action. The one or more allowed action, may include, but is not limited to, asking a query, push notifications, subscribing to a task, receiving guest persona task, verifying incoming data packets or accepting guest persona status.

Figure 10A:
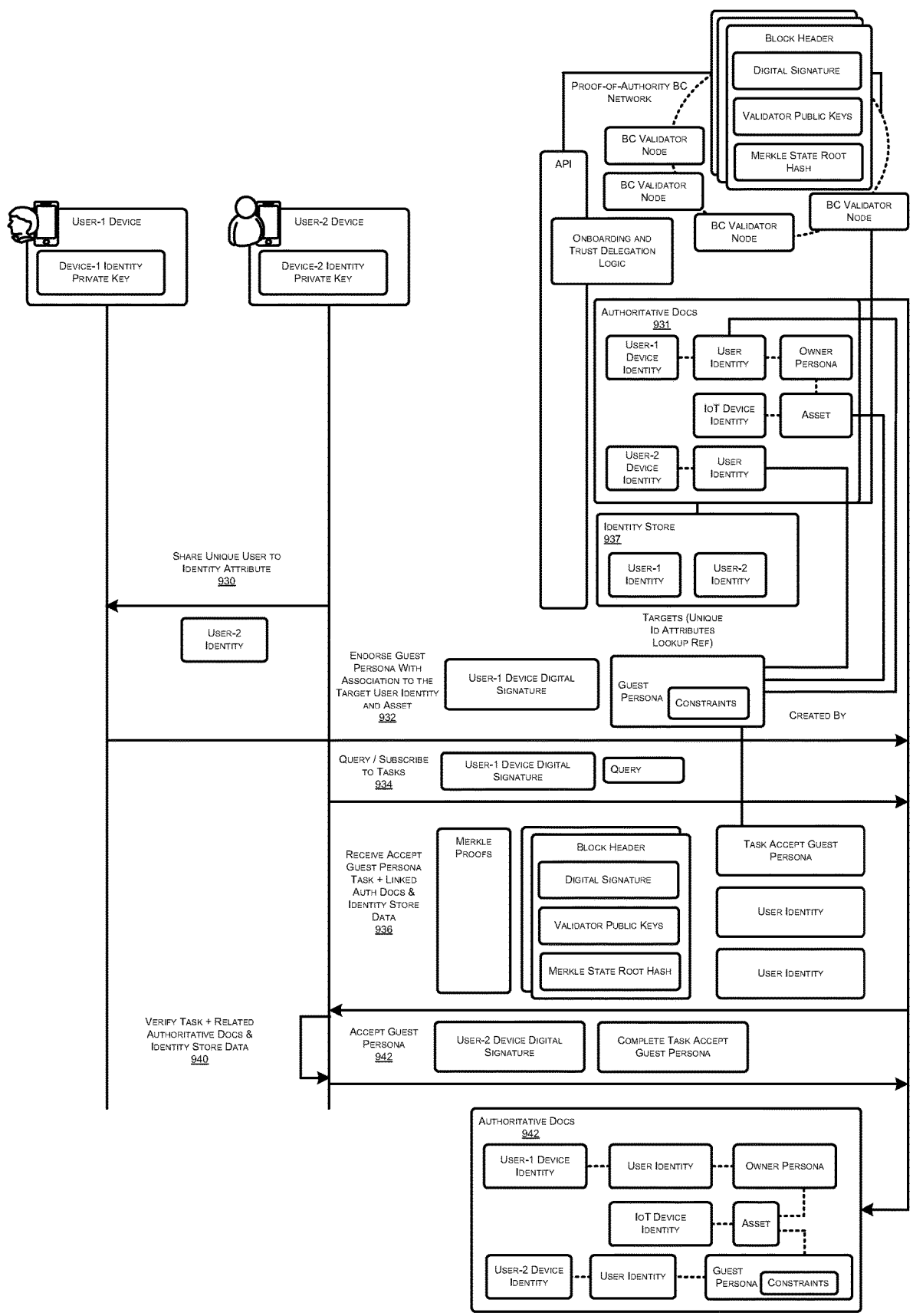
FIG. 10A illustrates an exemplary representation of sharing the authorization and authentication of the asset between user of user device (user-1) and a second user or guest user (user-2), according to an embodiment herein.

FIG. 10A, with reference to FIGS. 1 through 9C, illustrates an exemplary representation of sharing the authorization and authentication of the asset 106 between a user of user device (user-1) and a second user or guest user (user-2), according to an embodiment herein. In an aspect, and as illustrated in FIG. 10A, the second user (user-2) may share with the user (user-1), a unique identity attribute associated with the second user (user-2), as illustrated in step 930. In an embodiment, the sharing of the unique identity attribute may be performed by exchanging information over the user devices of the user (user-1 device) and the second user (user-2 device), using several means including, but is not limited to, exchange of phone number, QR code, or near-field communication data exchange. In an exemplary embodiment, the sharing of unique identity attribute may be by using a mobile application. Once the unique identity attribute is shared, the user (user-1) having "owner persona" status, using the user device, may endorse the second user or guest user (user-2), with a status of "guest persona" over the asset 106, as shown in step 932. It may be appreciated that the endorsing step may be extended to grant the second user (user-2) with a "restricted guest Persona" status over the asset 106, such that the "restricted guest Persona" may have limited authority, unlike the owner persona. The association to the second user (user-2) may be expressed as a lookup reference for which the value may comprise of the unique identity attribute shared in step 930.

In an embodiment, and as illustrated in step 934 of FIG. 10A, the second user (user-2) device may subscribe to features including, but is not limited to, any of push notifications, or else may provide one or more queries to the distributed ledger 114 for outstanding tasks in relation to its identity, and may authenticate by passing along a digital signature for the query string issued. The query may contain the second user (user-2) identity and the height of PoA trust anchor block header, of the second user (user-2) device. In an exemplary embodiment, the digital signature may be generated by the second user (user-2) device private key and may be verified by the trust delegation logic against the previously onboarded device identity public key. The initialization of the query or subscription may be performed at any point in time and may not depend on the sequence as illustrated in FIG. 10A.

In an embodiment, and as illustrated in step 936 of FIG. 10A, the second user (user-2) may receive an "Accept persona task" along with the user identity authoritative document of the user (user-1), the clear text representation of the digest identity attributes in the user identity authoritative document, and the associated consensus proofs & set of block headers.

In an embodiment, and as illustrated in step 940 of FIG. 10A, upon receipt of the task and document in step 936, the second user (user-2) may receive the clear text identity attributes (937), may recalculate the digests, and verify them against the values in the user identity authoritative document. Subsequently, the user identity authoritative document and task may be authenticated by verifying the consensus proof and set of block headers against the PoA trust anchor block header of the device of the second user (user-2). It may be appreciated that the verification of consensus proofs and the set of block headers may be similar to the process as discussed with respect to FIG. 8C and FIG. 8D, respectively. This unequivocally proves the identity of the user (user-1) to the second user (user-2), wherein any data tampering in the backend at any level may surface immediately.

In an embodiment, and as illustrated in step 942 of FIG. 10A, upon verification in step 940, the second user (user-2) may send a 'task completed' signal for the "Accept Guest Persona" task. Upon completion of the task, the trust delegation logic may finalize the state of the guest persona, and the endorsed second user (user-2) may download and verify proofs, and use those proofs to authenticate itself when interacting with the IoT device 108. The IoT device 108 may restrict certain actions taking the "guest persona" constraints into account.

In an embodiment, the endorsing of the second user and the grant of the "guest persona" status may result in generation of a set of verifiable electronic authoritative documents on the distributed ledger 114 (illustrated as 942 in FIG. 10A), wherein the electronic authoritative document may be indicative of the association between the asset 106 and the owner persona associated with the user (user-1) as well as between the asset 106 and the guest persona associated with the second user (user-2) or guest user. The grant of the "guest persona" title may establish a persona relationship between the second user and asset 106, which may keep the relationship intact even as the originally onboarded second user device changes. This may be really useful in scenarios where the second user may lose the device, and the identity related to the original second user device may be easily recovered due to the aforementioned established relationship, thereby avoiding the need to undertake additional steps or action to reassert the guest persona status over the asset 106.

In an exemplary embodiment, an additional task may be generated for the user (user-1) to confirm the guest persona after the second user (user-2) may have accepted it, wherein the user (user-1), at this point, may receive the user identity authoritative document for the second user (user-2), which may be verified to ensure or verify if the status of guest persona is granted to the intended person.

Figure 10B:
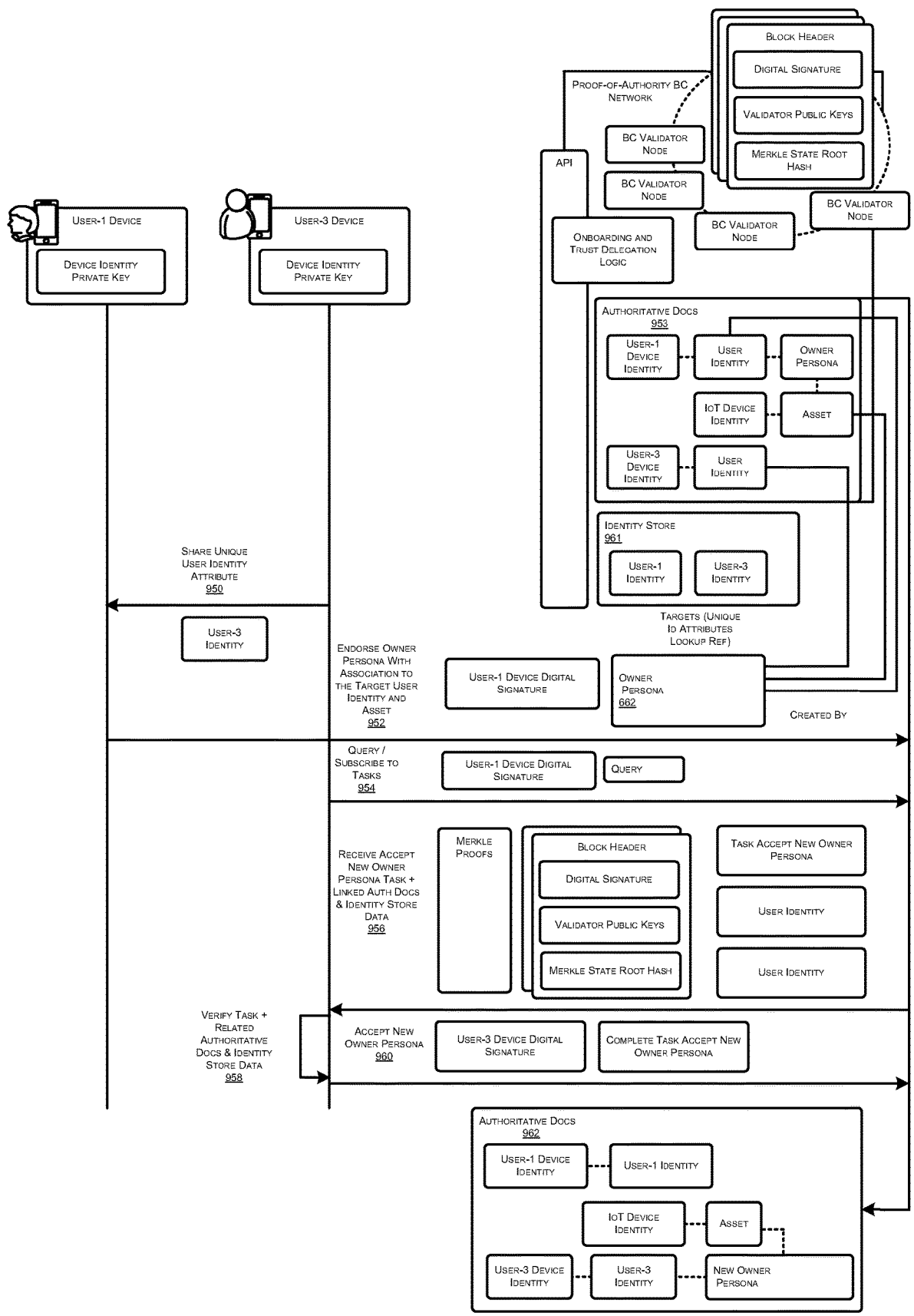
FIG. 10B illustrates an exemplary representation for the transfer of ownership related to authorization and authentication of the asset from a user or original user (user-1) of a user device to a third user or new user (user-3), according to an embodiment herein.

In an aspect, the ownership of the user 102 over the asset 106 may be transferred to a third user based on an endorsement, by the user 102, of the user persona to an identity of the third user and the asset 106, wherein at least one attribute of the third user may be associated in the distributed ledger 114, so as to identify and authenticate the third user based on a digital signature of the third user. FIG. 10B, with reference to FIGS. 1 through 10A, illustrates an exemplary representation for a transfer of ownership related to authorization and authentication of the asset 106 from the user or original user (user-1) of the user device to a third user or new user (user-3), according to an embodiment herein.

In an aspect, and as illustrated in FIG. 10B, the third user or new user (user-3) may share with the user (user-1), a unique identity attribute associated with the third user (user-3), as illustrated in step 950. In an embodiment, the sharing of the unique identity attribute may be performed by exchanging information over the user device of user (user-1 device) and third user (user-3 device), using several means including, but not limited to, the exchange of a phone number, QR code, or near-field communication data exchange. In an exemplary embodiment, the sharing of the unique identity attribute may be performed by using a mobile application. Once the unique identity attribute is shared, the user (user-1) having the "owner persona" status (662), using the user-1 device, may endorse the third user or new user (user-3), with a status of "new owner persona" over the asset 106, as shown in step 952. The association to the third user (user-3) may be expressed as a lookup reference for which the value may the digest of the unique identity attribute shared in step 930.

In an embodiment, and as illustrated in step 954 of FIG. 10A, the third user or the new user (user-3) device may subscribe to features including, but not limited to, push notifications, or else may provide one or more queries to the distributed ledger 114 for outstanding tasks in relation to its identity, and may authenticate by passing along a digital signature for the query string issued. The query may contain the third user (user-3) identity and the height of PoA trust anchor block header of the third user (user-3) device. In an exemplary embodiment, the digital signature may be generated by the third user (user-3) device private key and may be verified by the trust delegation logic against the previously onboarded device identity public key. The initialization of the query or subscription may be performed at any point in time and may not depend on the sequence as illustrated in FIG. 10B.

In an embodiment, and as illustrated in step 956 of FIG. 10B, the third user (user-3) may receive an "Accept new owner persona task" along with the user identity authoritative document of the user (user-1), the clear text representation of the digest identity attributes in the user identity authoritative document, and the associated consensus proofs & set of block headers.

In an embodiment, and as illustrated in step 958 of FIG. 10B, upon receipt of task and document in step 956, the third user (user-3) may receive the clear text identity attributes (961), may recalculate the digests, and verify them against the values in the user identity authoritative document. Subsequently, the user identity authoritative document and task may be authenticated by verifying the consensus proof and set of block headers against the PoA trust anchor block header of the device of the third user (user-3). The verification of consensus proofs and the set of block headers may be similar to the steps corresponding to FIG. 8C and FIG. 8D, respectively. This may unequivocally prove the identity of the user (user-1) to the third user (user-3), wherein any data tampering in the backend at any level may surface immediately.

In an embodiment, and as illustrated in step 960 of FIG. 10B, upon verification in step 958, the third user (user-3) may send a 'task completed' signal for the "Accept new owner Persona" task. Upon completion of the task, the trust delegation logic may finalize the state of the new owner persona, and the endorsed third user or the new user (user-3) may download and verify proofs, and use those proofs to authenticate itself when interacting with the IoT device 108.

In an embodiment, the endorsing of the third user and the grant of the "new Owner Persona" status may result in generation of a set of verifiable electronic authoritative documents, on the distributed ledger 114 (illustrated as 962 in FIG. 10B), wherein the electronic authoritative document may be indicative of the association between the asset 106 and the new owner persona associated with the third user. The grant of a "guest persona" title may establish a persona relationship between the second user and asset 106, which may keep the relationship intact even as the originally onboarded second user device changes. This may be really useful in scenarios where the third user may lose the device, and the identity related to the original second user device may be easily recovered due to the aforementioned established relationship, thereby avoiding the need to undertake additional steps or action to reassert the guest persona status over the asset 106.

In an aspect, the IoT device 108 and user device 104 may trust each other by comparing the incoming block header(s) against trust anchor of the IoT device 108 and the user device 104, wherein digital signatures on an incoming block header may be verified by a quorum of Proof-of-Authority (PoA) validator nodes public keys that may be already trusted on the respective devices. In an aspect, the PoA trust anchor block including the PoA validator nodes public keys may be incorporated or installed on the IoT device 108, at the time of programming or setting up the IoT device 108, as discussed later with respect to FIG. 12. The user device 104 may receive the PoA trust anchor block from the IoT device 108, through the communication interface as discussed above.

Figure 11A:
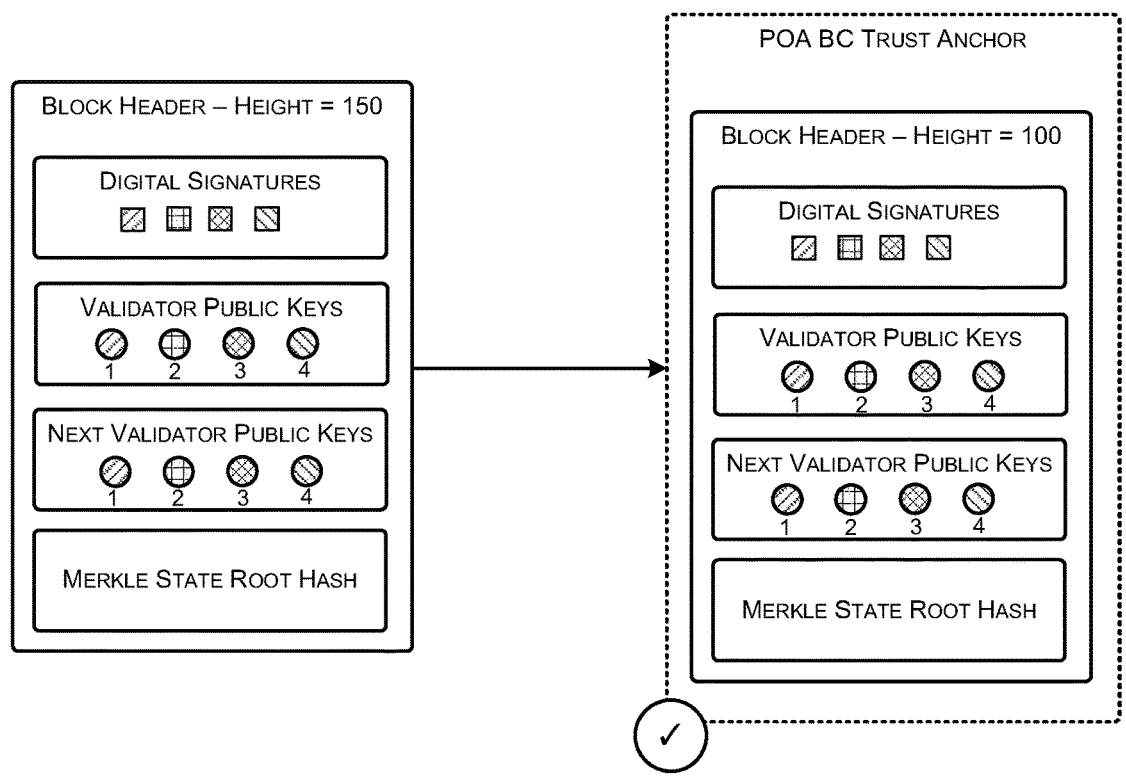
FIG. 11A illustrates the comparison of incoming block header(s) against PoA trust anchor of device, that indicates matching of the validator node public keys of the incoming block header(s) with validator node public keys of the PoA trust anchor of device, according to an embodiment herein.

FIG. 11A, with reference to FIGS. 1 through 10B, illustrates the comparison of incoming block header(s) against a PoA trust anchor of device, that indicates matching of the validator node public keys of the incoming block header(s) with the validator node public keys of the PoA trust anchor of device, according to an embodiment herein. The "device" refers to any of a user device, IoT device 108, second user device, third user device, or any other device discussed herein, that performs the comparison of the incoming block header(s) against PoA trust anchor. As illustrated in FIG. 11A, the validator node public keys of the incoming header exactly match with the validator node public keys of the PoA trust anchor of any device, and hence the incoming headers may be trusted easily.

Figure 11B:
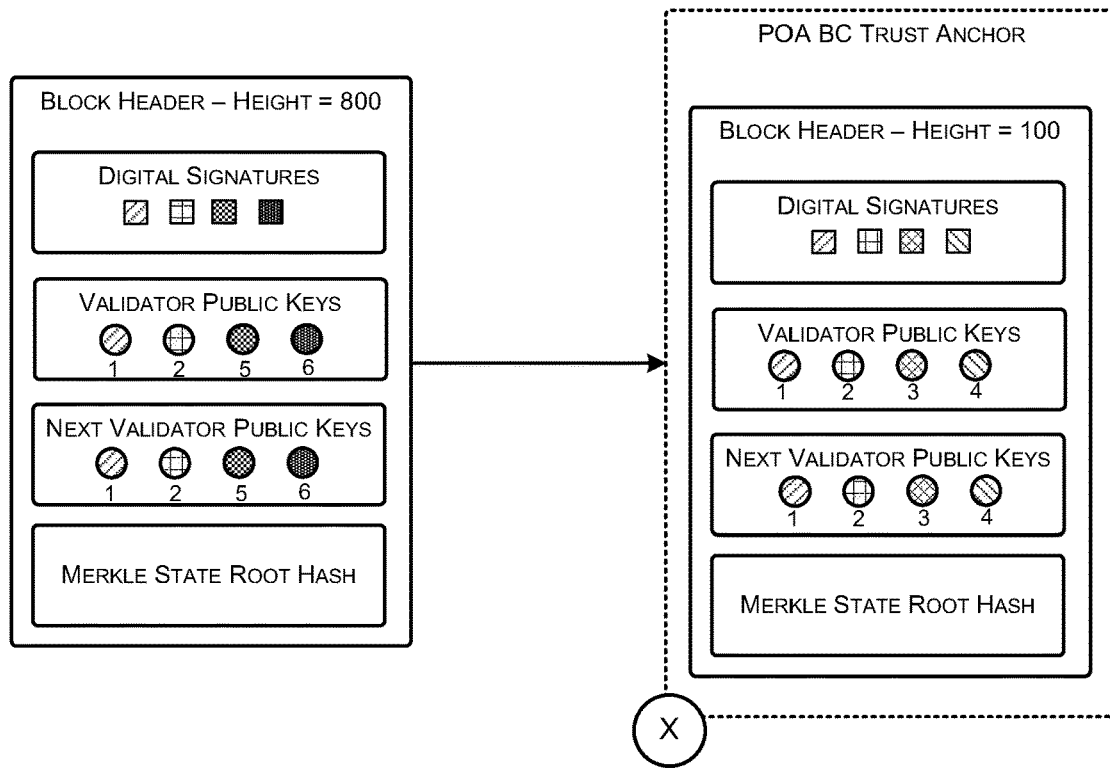
FIG. 11B illustrates the comparison of incoming block header(s) against a PoA trust anchor of device, that indicates a case of mismatching of the validator node public keys of the incoming block header(s) with validator node public keys of the PoA trust anchor of device, according to an embodiment herein.

FIG. 11B, with reference to FIGS. 1 through 11A, illustrates the comparison of the incoming block header(s) against the PoA trust anchor of the device, that indicates a case of mismatching of the validator node public keys of the incoming block header(s) with the validator node public keys of the PoA trust anchor of device, according to an embodiment herein. The "device" refers to any of a user device, IoT device 108, second user device, third user device, or any other device discussed herein, that perform the comparison of the incoming block header(s) against the PoA trust anchor. In an exemplary embodiment, and as illustrated in FIG. 11A, the validator node pub keys of the incoming header with height 150 may exactly match with the validator node public keys of the PoA trust anchor of the device, and hence the incoming headers may be trusted easily.

Figure 11C:
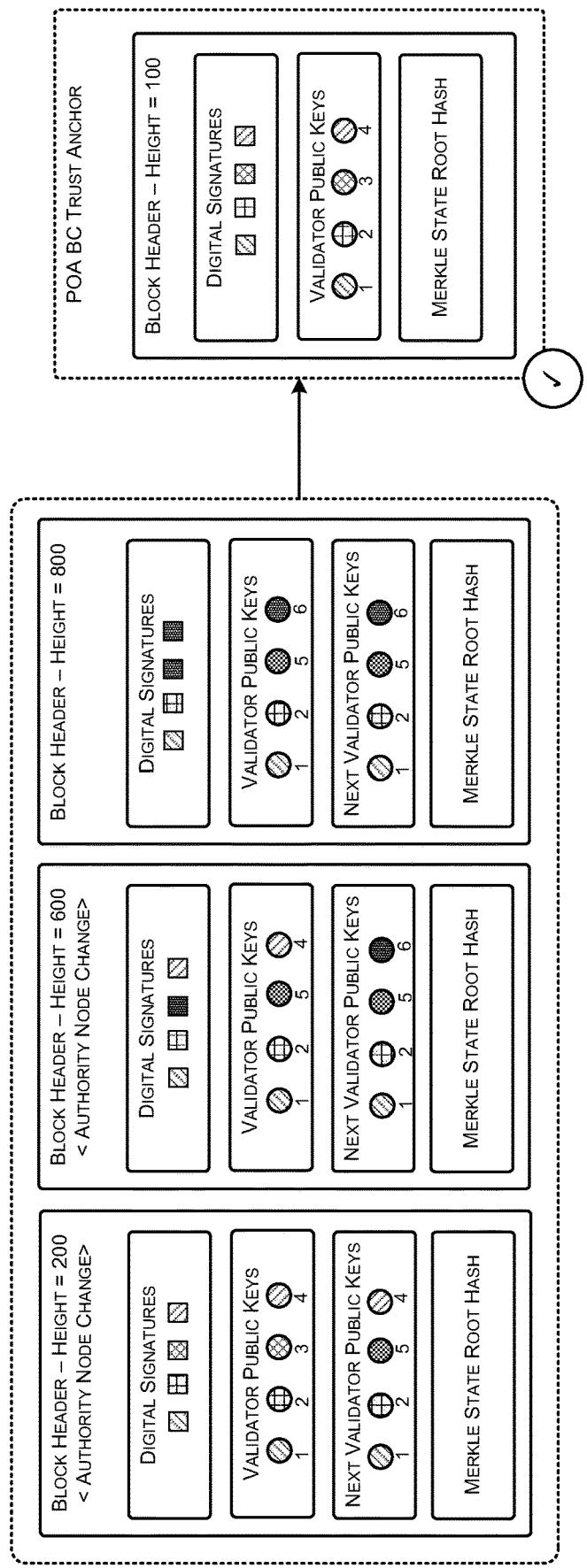
FIG. 11C illustrates an exemplary representative for a solution provided in the case of mismatching of the validator node public keys of the incoming block header(s) with validator node public keys of the PoA trust anchor of device, as shown in FIG. 11B, according to an embodiment herein.

In another exemplary embodiment, and as illustrated in FIG. 11C, with reference to FIGS. 1 through 11B, after the comparison of incoming block header(s) against the PoA trust anchor of device, and subsequent mismatching of the validator node pub keys latest incoming block header with that of the device (as shown in FIG. 11B), due to the incoming block header having partially or fully different set of unknown validator nodes, a solution may be provided by the embodiments herein, so as to enable authentication based on the bridging of trust by means of other block headers. In an exemplary embodiment, and as illustrated in FIG. 11C, a solution may be provided in the case of mismatching between the validator node pub keys of the incoming header (at height 800) and the validator node public keys of the PoA trust anchor of the device. The solution may include bridging a trust with other incoming authority node change headers. As illustrated in FIG. 11C, the set of incoming block headers may include the header with height 800, and additionally, 2 authority node change headers at height 200 and 600, which may bridge the trust. The block header with height 200 may include a new validator key (numbered as 5) for validating the next headers and has signatures that can be verified by the known validator pub keys in the trust anchor (at block header height 100) on the device. The device trust anchor may be updated with the header at height 200. The block header with height 600 may include a new validator key (numbered as 6) for validating the next headers and may have signatures that may be verified by the known validator pub keys in the trust anchor (at block header height 200) on the device. The device trust anchor may be updated with the header at height 600. Thus, the block header with height 800 may now be trusted as its signatures can be verified by the known validator pub keys in the trust anchor on the device.

Figure 12:
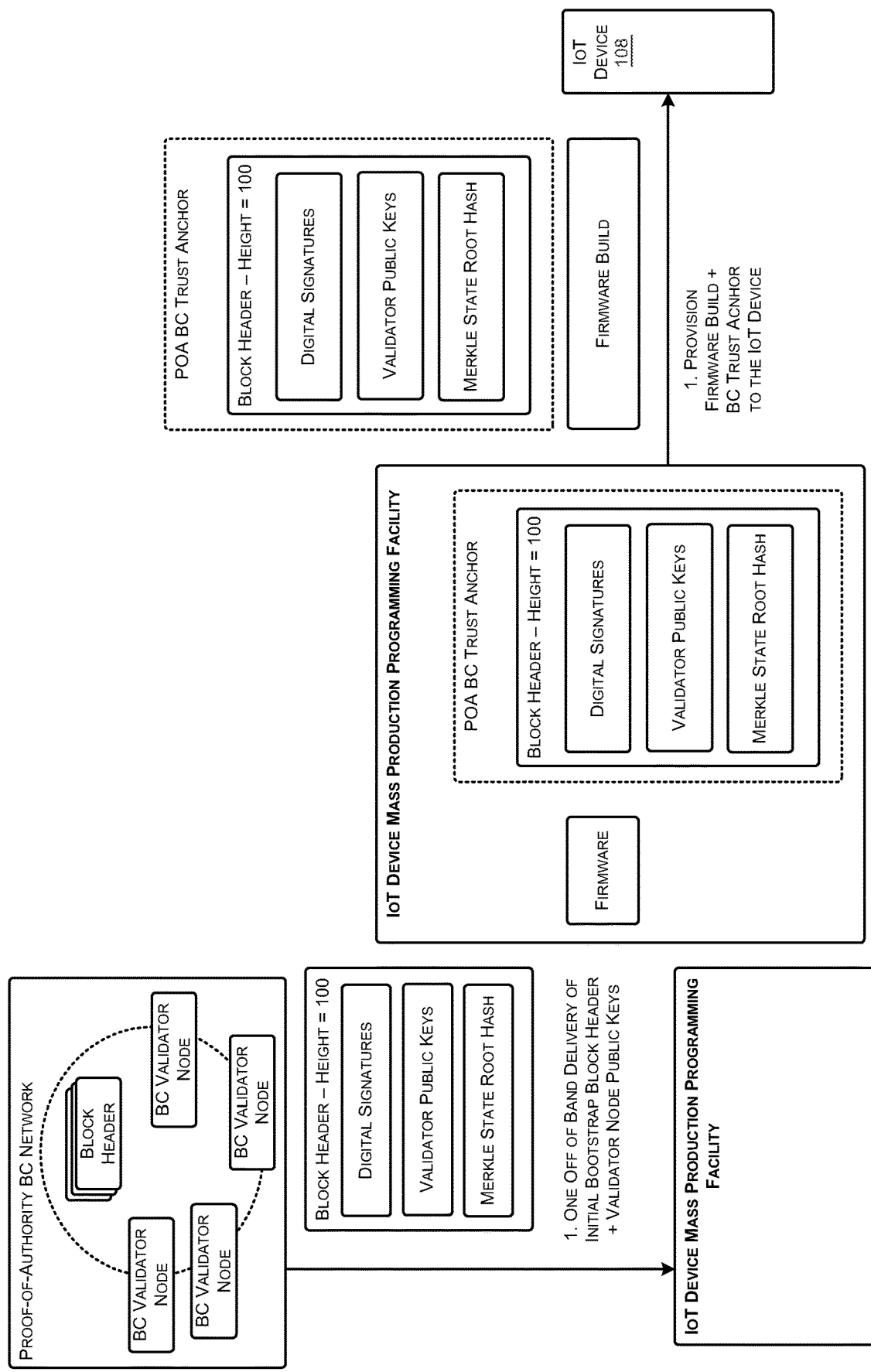
FIG. 12 illustrates an exemplary representation of the incorporation or addition of the Proof-of-Authority trust anchor of a distributed ledger in an IoT device, during a programming or installation step, according to an embodiment herein.

FIG. 12, with reference to FIGS. 1 through 11C, illustrates an exemplary representation of the incorporation or addition of the Proof-of-Authority trust anchor of a distributed ledger 114 in an IoT device 108, during a programming or installation step, according to an embodiment herein, wherein the Proof-of-Authority trust anchor may be signed using private keys of a set of validator nodes on a distributed ledger 114, in accordance with embodiments herein. In some examples, the trust anchors can be either all the same or they can be unique to each IoT device 108. As illustrated in FIG. 12, the Proof-of-Authority trust anchor of the distributed ledger 114, may include block headers with public keys corresponding to the validator nodes, which may be transmitted to a IoT device mass production programming facility, which may be further used for incorporating or installing the PoA trust anchor in the IoT device 108 during the firmware build operation step. The installation or incorporation of the PoA trust anchors in the IoT device 108, may not be limited to the operations, as stated above.

The embodiments herein provide a system and method for secure authentication and authorization between a user device and an IoT device 108 that is associated with an asset 106. Moreover, the embodiments herein provide a method that can enable authentication and authorization of a user device 104 for accessing an IoT device 108, associated with an asset 106, in an offline mode. Furthermore, the embodiments herein provide a method that can enable multiple user devices to securely access an IoT device 108, associated with an asset 106, in an offline mode.

The embodiments herein may be implemented entirely hardware, entirely software (including firmware, resident software, micro-code, etc.) or combining software and hardware implementation that may all generally be referred to herein as a "circuit," "module," "component," or "system." Furthermore, aspects of the embodiments herein may take the form of a computer program product comprising one or more computer readable media having computer readable program code embodied thereon.

Thus, it will be appreciated by those skilled in the art that the diagrams, schematics, illustrations, and the like represent conceptual views or processes illustrating systems and methods embodying the embodiments herein. The functions of the various elements shown in the figures may be provided through the use of dedicated hardware as well as hardware capable of executing associated software. Those skilled in the art further understand that the exemplary hardware, software, processes, methods, and/or operating systems described herein are for illustrative purposes and, thus, are not intended to be limited to any particular named component, system, device, or method.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for secure authentication and authorization between a user device and an Internet of Things (IoT) device that is associated with an asset, the method comprising:
   onboarding, using one or more processors that are operatively associated with a distributed ledger, an identity of the user device at least based on a public key identity of the user device;
   onboarding an identity of a user of the user device based on an electronic user identity authoritative document that is stored on the distributed ledger, wherein an onboarded user device is mapped with an onboarded user identity;
   onboarding an identity of the IoT device and an identity of the asset in a manner such that association between the asset and the IoT device is endorsed on the distributed ledger based on an electronic signature generated by the user device using a user device respective private key, an endorsement further establishing a relationship between the user and the asset, wherein the onboarding of the identity of the IoT device comprises storing a public key identity of the IoT device, and updating a Proof of Authority (PoA) trust anchor block height for the IoT device; and
   facilitating the user device to retrieve a first set of data packets representative of any of a relevant electronic authoritative document(s), associated consensus proof(s), and block header(s) from the distributed ledger, the first set of data packets being used by the user device for:
      asserting and verifying relationships between a private key identity of the user device and the relevant electronic authoritative document(s) associated with any of a user device identity, a user identity, a persona status granted to the user over the asset, an asset identity, and the identity of the IoT device;
      verifying the associated consensus proof(s) for each retrieved authoritative document against respective block header(s); and
      verifying the block header(s) against a PoA distributed ledger trust anchor so as to update the block header(s).

2. The method of claim 1, wherein the IoT device comprises a low-powered and resource constrained IoT device.

3. The method of claim 1, wherein the user device comprises any of a smartphone, a mobile electronic device, and a smart computing device.

4. The method of claim 1, wherein the asset is selected from any of a vehicle, home, factory, office, building, residential property, or any part thereof.

5. The method of claim 1, wherein the IoT device comprises any of a microcontroller and an electronic control unit (ECU).

6. The method of claim 1, wherein the distributed ledger is a blockchain.

7. The method of claim 1, wherein the user identity authoritative document is associated with a user identity attribute selected from any of a phone number, an email address, a driver license number, a social security number, and a unique user identity number.

8. The method of claim 1, wherein any of the user and the asset are represented through multiple devices.

9. The method of claim 1, wherein, when the IoT device is working in an offline environment, the method further comprising:
  connecting the user device with the IoT device over an available communication interface so as to authenticate the user device by transmitting a second set of data packets to the IoT device, the second set of data packets being selected from the first set of data packets, wherein the second set of data packets being used for:
    verifying, at the IoT device, an authenticity and integrity of the received second set of data packets, a verification comprising verifying relationships between the relevant authoritative document(s) and a private key identity of the IoT device;
    verifying, at the IoT device, using the second set of data packets, consensus proofs for each authoritative document against the respective block header(s); and
    verifying, at the IoT device, the block header(s) against the block header of the PoA distributed ledger trust anchor so as to update the block header(s).

10. The method of claim 9, wherein the user device is configured to connect with the IoT device over the communication interface for receiving the public key identity of the IoT device and the PoA trust anchor block height for the IoT device, prior to transmission of the second set of data packets by the user device, wherein using the communication interface is selected from any of a Bluetooth® low energy (BLE) device, near field communication (NFC) device, radio frequency (RF) device, ultra wideband (UWB) device, and Controller Area Network bus (CAN bus) device.

11. The method of claim 1, wherein the user device transmits a first authentication message with a first digital signature to the IoT device in a manner such that the IoT device uses a first public key of the user device to verify the first digital signature, and authorizes the first authentication message by verifying the persona status that an authenticated user is granted over the asset.

12. The method of claim 11, wherein the IoT device transmits a second authentication message with a second digital signature to the user device in a manner such that the user device uses a second public key of the IoT device to verify the second digital signature and to confirm that the second authentication message originated from the IoT device that is linked to the asset that the user device initiated contact with.

13. The method of claim 12, wherein the user device uses a user device private key to generate a third digital signature for an ephemeral key representation, and sends both the third digital signature and the ephemeral key representation to the IoT device in a manner such that the IoT device authenticates the ephemeral key representation from the user device based on the third digital signature and the first public key.

14. The method of claim 13, wherein the IoT device uses an IoT device private key to generate a fourth digital signature for the ephemeral key representation and sends both the fourth digital signature and the ephemeral key representation to the user device such that the user device authenticates the ephemeral key representation from the IoT device based on the fourth digital signature and the second public key so as to allow both the user device and the IoT device to possess each other's ephemeral public key and have authenticated an origin of an ephemeral public key based on which a standardized key exchange protocol is enabled.

15. The method of claim 1, wherein the user, using the user device, endorses a second user, wherein the second user is a previously onboarded user, with a guest persona over the asset, wherein the second user shares a unique identity attribute with the user, and wherein at least one attribute of the second user is associated in the distributed ledger so as to identify and authenticate the second user based on a digital signature of the second user.

16. The method of claim 15, wherein the user endorses the second user in relation to the asset based on one or more constraints, the constraints being selected from any of a time of access, location of access, and one or more allowed action.

17. The method of claim 15, wherein ownership of the user over the asset is transferred to a third user based on an endorsement, by the user, of a persona of the user to an identity of the third user and the asset, and wherein at least one attribute of the third user is associated in the distributed ledger so as to identify and authenticate the third user based on a digital signature of the third user.

18. The method of claim 1, wherein the IoT device and the user device trust each other by comparing an incoming block header(s) against a trust anchor of the IoT device and the user device, wherein digital signatures on an incoming block header are verified by a quorum of PoA validator nodes public keys that are already trusted on the user device and the IoT device.

19. A non-transitory computer readable storage medium storing one or more sequences of instructions, which when executed by one or more processors, causes secure authentication and authorization between a user device and an Internet of Things (IoT) device associated with an asset, by performing a method comprising:
  onboarding, using one or more processors that are operatively associated with a distributed ledger, an identity of the user device at least based on a public key identity of the user device;
  onboarding an identity of a user of the user device based on an electronic user identity authoritative document that is stored on the distributed ledger, wherein an onboarded user device is mapped with an onboarded user identity;
  onboarding an identity of the IoT device and an identity of the asset in a manner such that association between the asset and the IoT device is endorsed on the distributed ledger based on an electronic signature generated by the user device using a user device respective private key, an endorsement further establishing a relationship between the user and the asset, wherein the onboarding of the identity of the IoT device comprises storing a public key identity of the IoT device, and updating a Proof of Authority (PoA) trust anchor block height for the IoT device; and facilitating the user device to retrieve a first set of data packets representative of any of a relevant electronic authoritative document(s), associated consensus proof(s), and block header(s) from the distributed ledger, the first set of data packets being used by the user device for:

asserting and verifying relationships between a private key identity of the user device and the relevant electronic authoritative document(s) associated with any of a user device identity, a user identity, a persona status granted to the user over the asset, an asset identity, and the identity of the IoT device;

verifying the associated consensus proof(s) for each retrieved authoritative document against respective block header(s); and verifying the block header(s) against a PoA distributed ledger trust anchor so as to update the block header(s).

20. A system for secure authentication and authorization between a user device and an Internet of Things (IoT) device that is associated with an asset, the system comprising:

one or more computing devices; and a blockchain system configured to host a blockchain, the blockchain being accessible by each of the one or more computing devices, wherein the one or more computing devices comprise one or more processors coupled with a memory, the memory storing instructions which when executed by the one or more processors cause the system to:

onboard, using one or more processors that are operatively associated with a blockchain, an identity of the user device at least based on a public key identity of the user device;

onboard an identity of a user of the user device based on an electronic user identity authoritative document that is stored on the blockchain, wherein an onboarded user device is mapped with an onboarded user;

onboard an identity of the IoT device and an identity of the asset in a manner such that association between the asset and the IoT device is endorsed on the blockchain based on an electronic signature generated by the user device using a user device respective private key, an endorsement further establishing a relationship between the user and the asset, wherein onboarding of the identity of the IoT device comprises storing a public key identity of the IoT device, and updating a Proof of Authority (PoA) trust anchor block height for the IoT device; and facilitate the user device to retrieve a first set of data packets representative of any of a relevant electronic authoritative document(s), associated consensus proof(s), and block header(s) from the blockchain, the first set of data packets being used by the user device to:

assert and verify relationships between a private key identity of the user device and the relevant electronic authoritative document(s) associated with any of user device identity, a user identity, a persona status granted to the user over the asset, the asset, and the identity of the IoT device;

verify the associated consensus proof(s) for each retrieved authoritative document against respective block header(s); and verify the block header(s) against a PoA blockchain trust anchor so as to update the block header(s).

* * * * *